July 5, 1949.　　　　D. R. PUTT　　　　2,474,861
CONTROL
Filed July 1, 1940　　　　　　　　　　　12 Sheets-Sheet 1
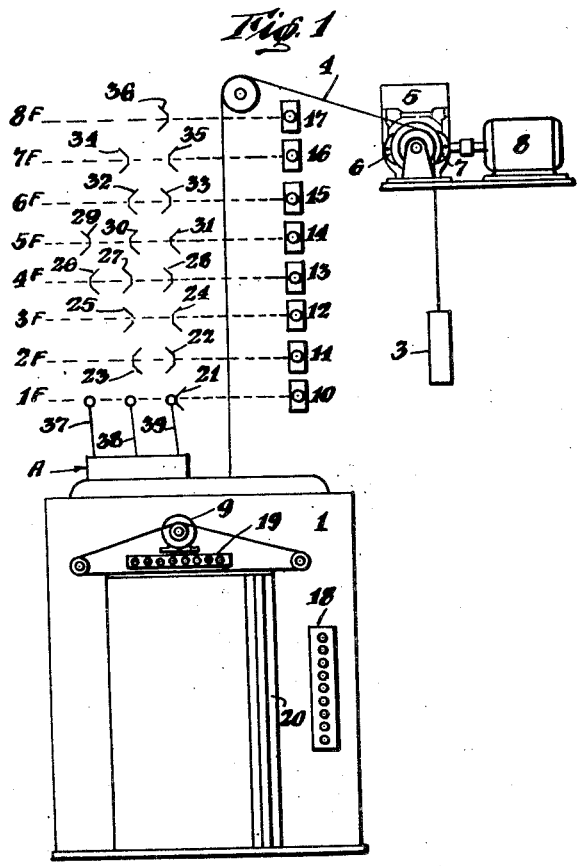
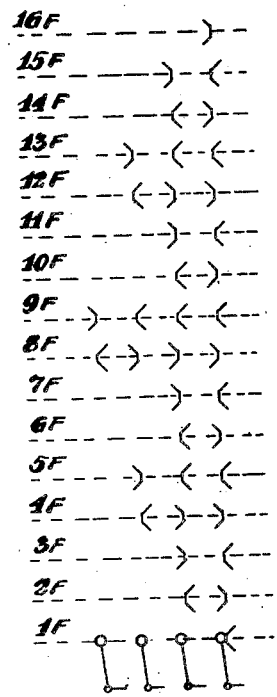
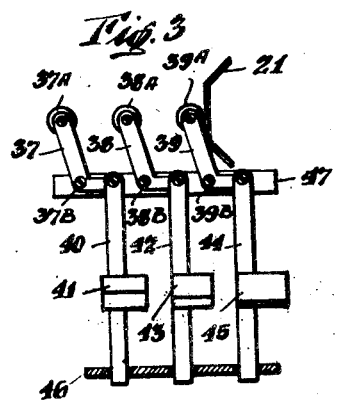
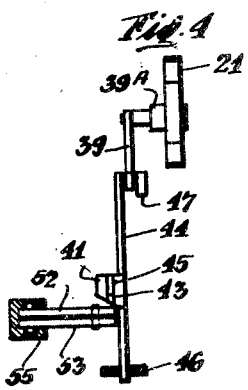
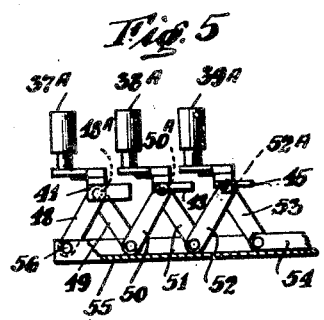
INVENTOR
Donald R. Putt
BY
*Hogart, Meany & Campbell*
his ATTORNEYS

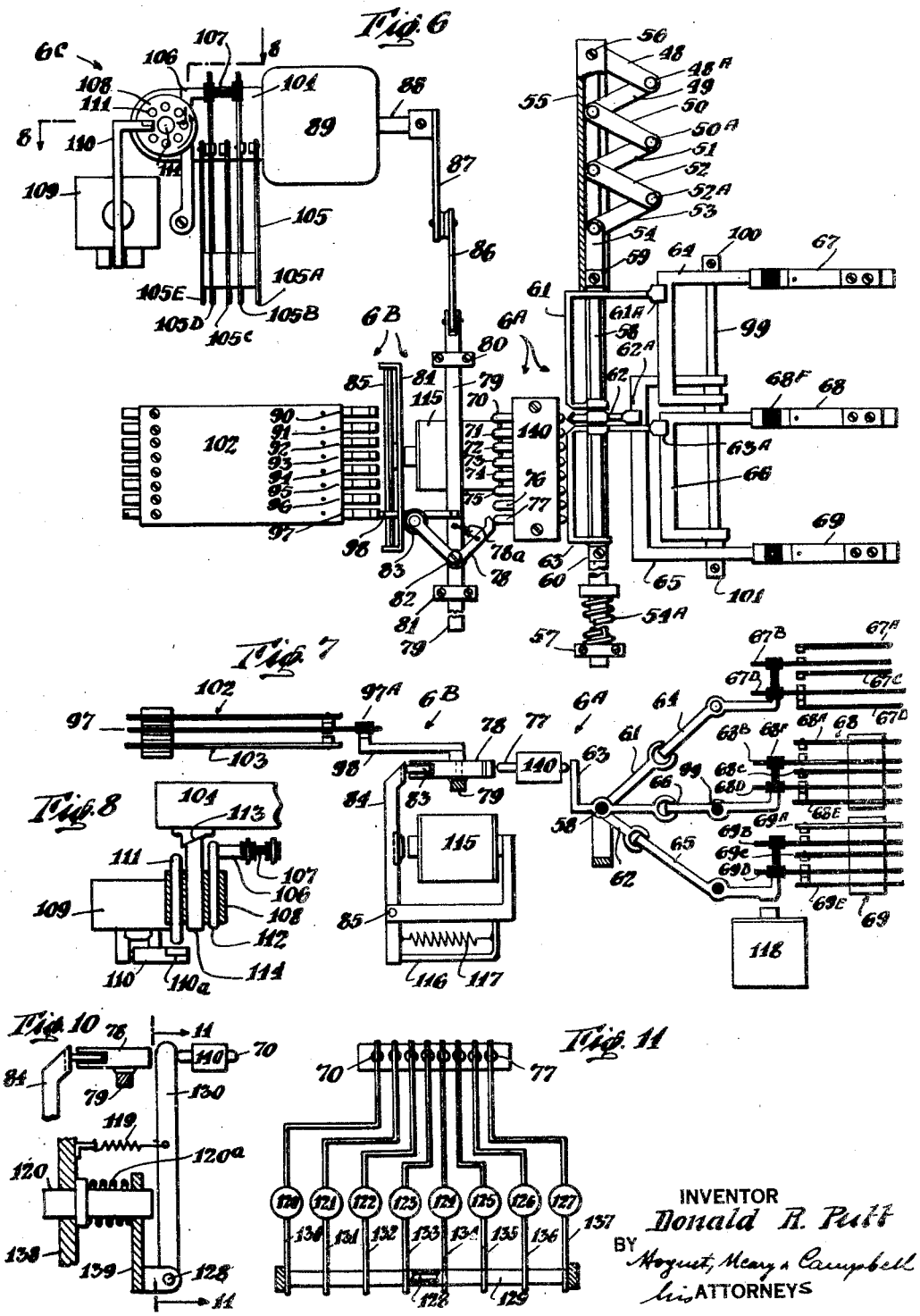

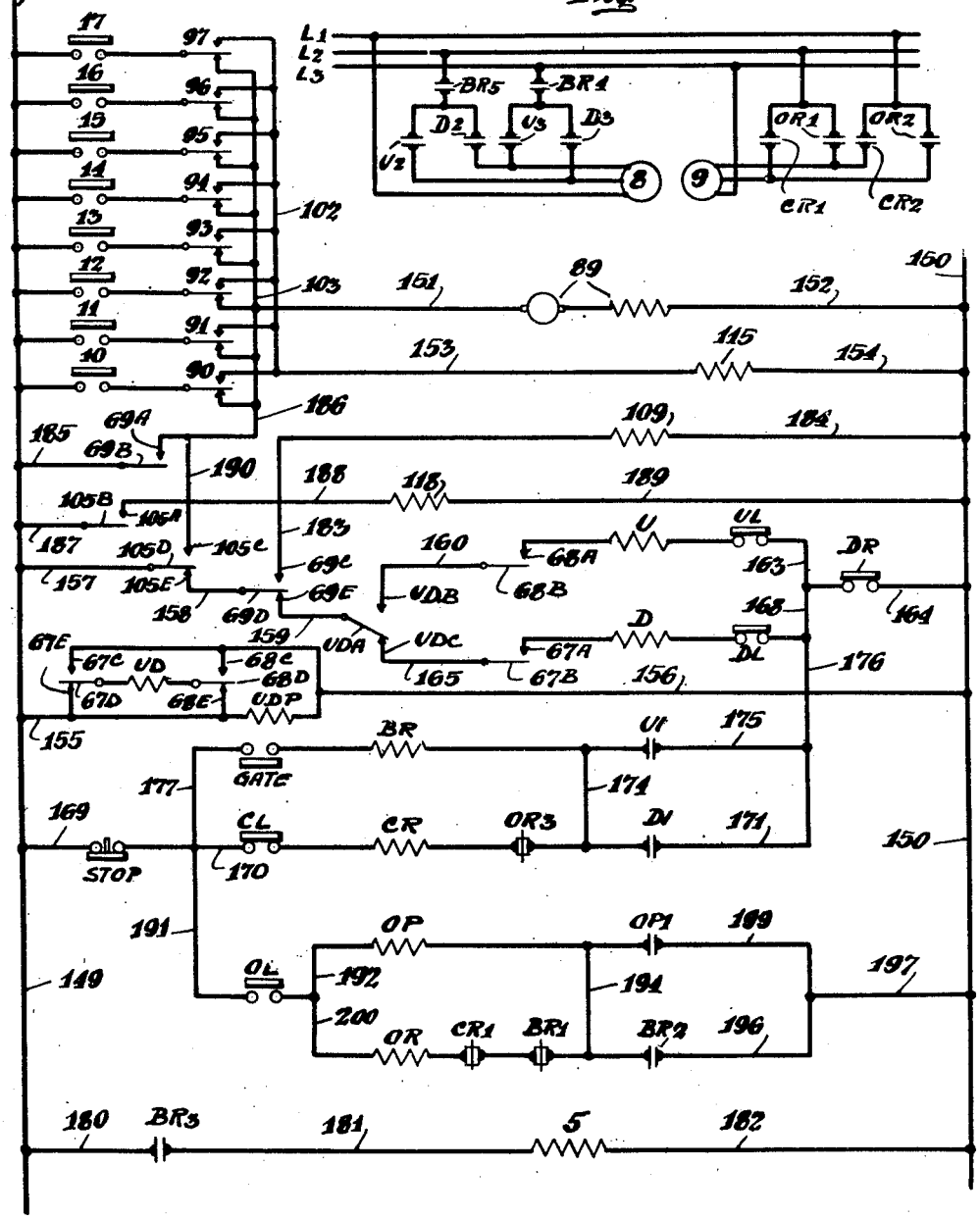

July 5, 1949.  D. R. PUTT  2,474,861
CONTROL

Filed July 1, 1940  12 Sheets—Sheet 5

INVENTOR
DONALD R. PUTT

BY Leland L. Chapman

ATTORNEY

July 5, 1949.　　　　D. R. PUTT　　　2,474,861
CONTROL
Filed July 1, 1940　　　　12 Sheets-Sheet 6
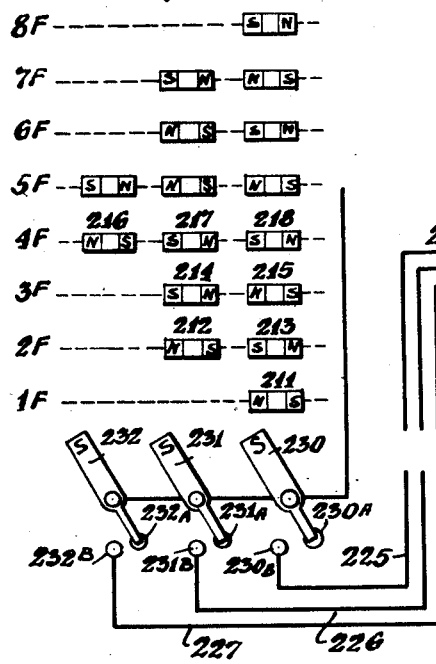
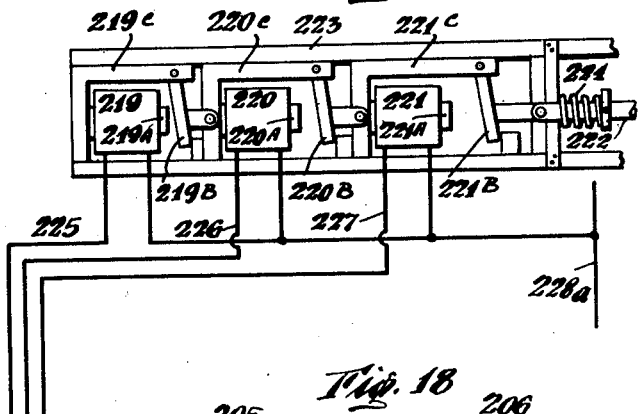
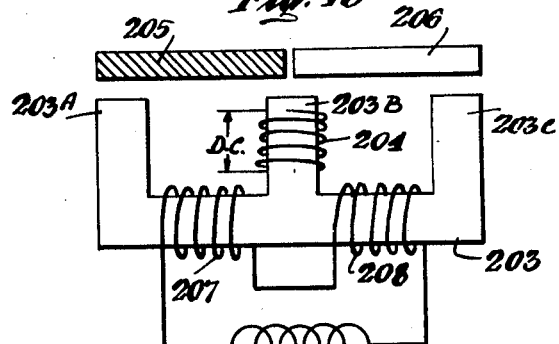
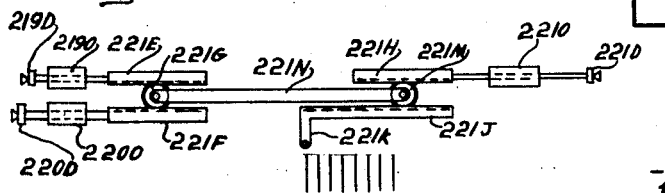
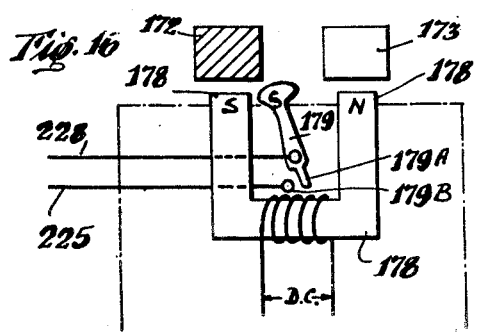
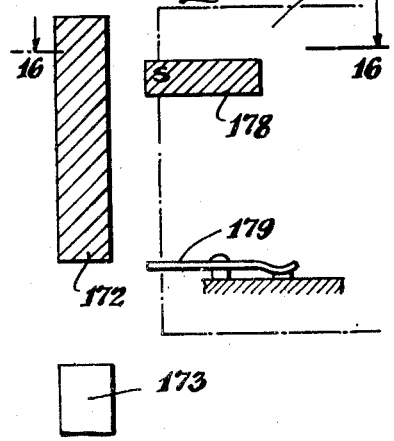
INVENTOR
Donald R. Putt
BY
his ATTORNEYS

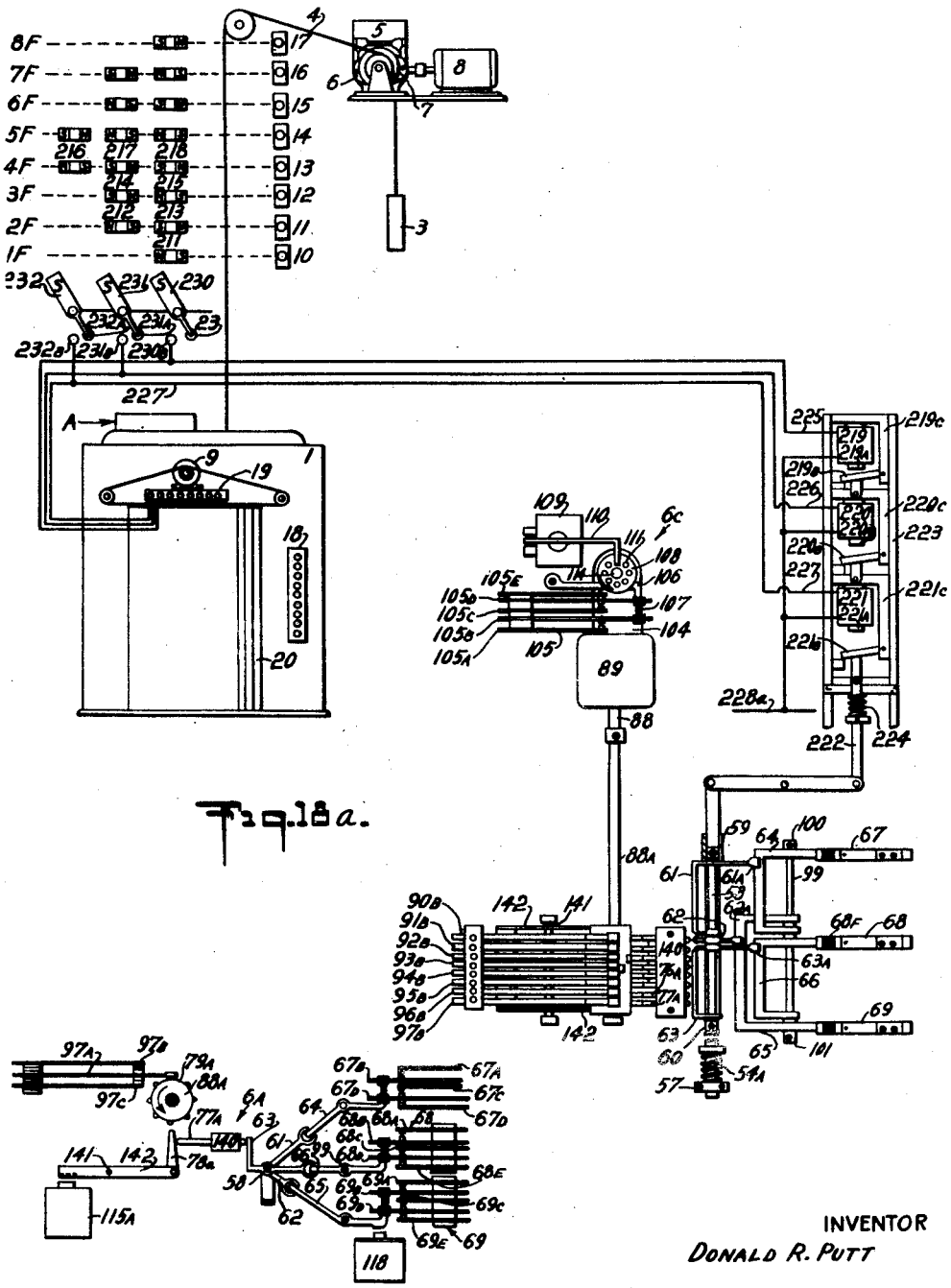

INVENTOR
DONALD R. PUTT

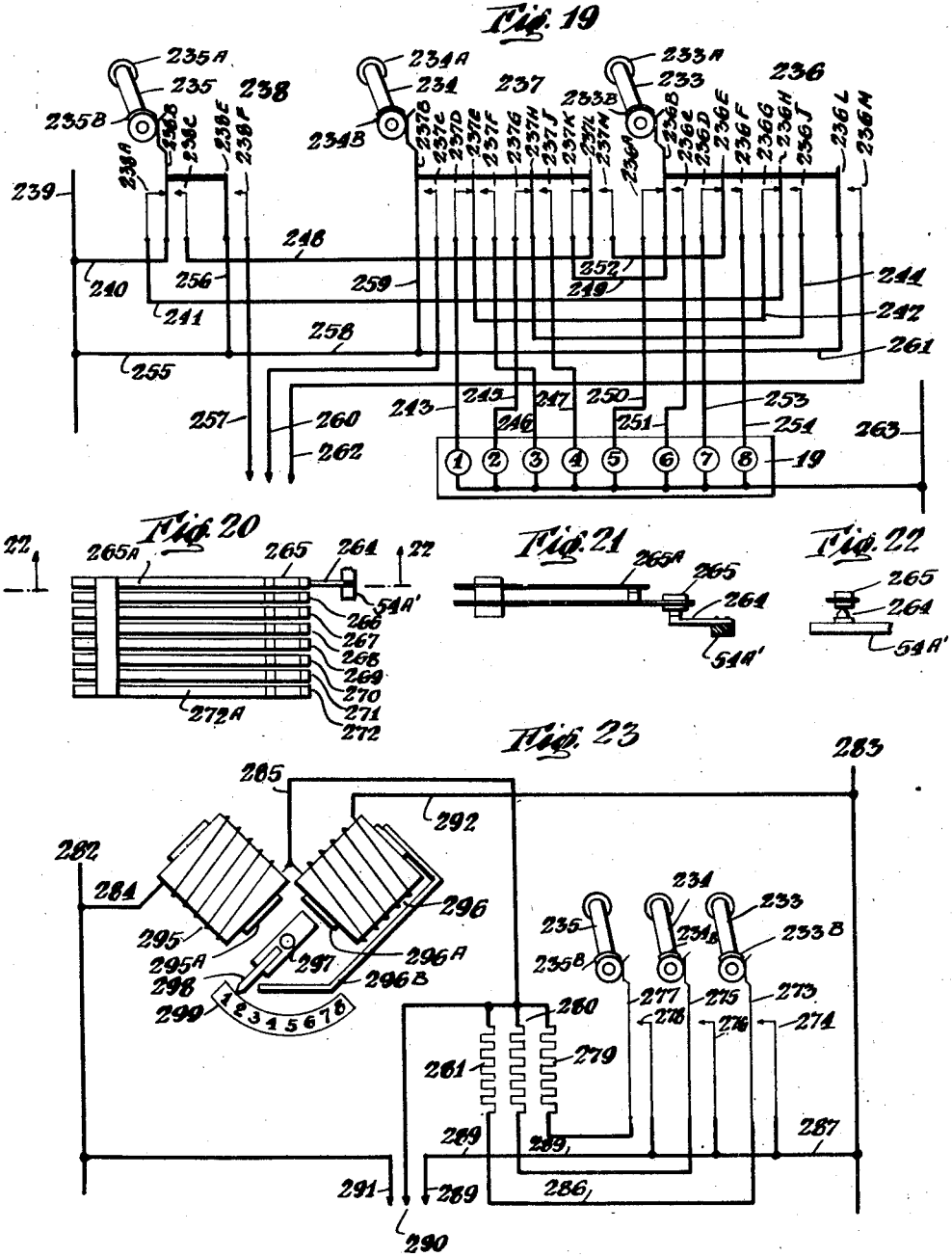

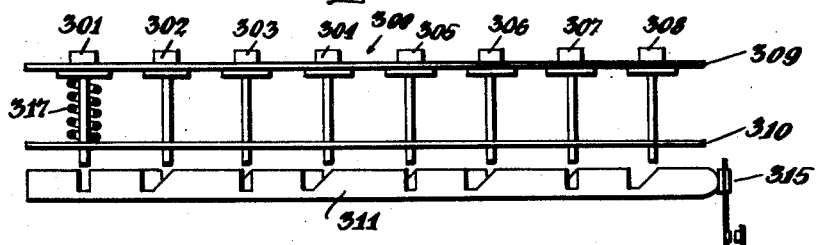
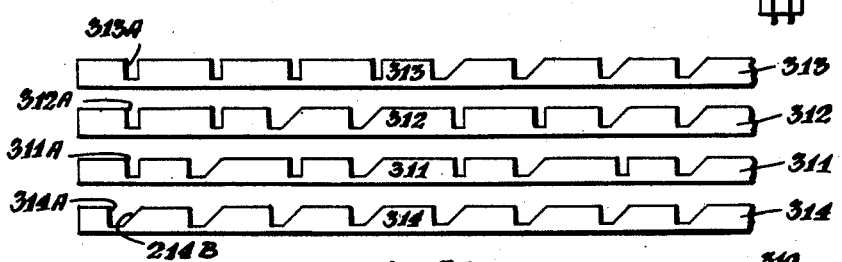
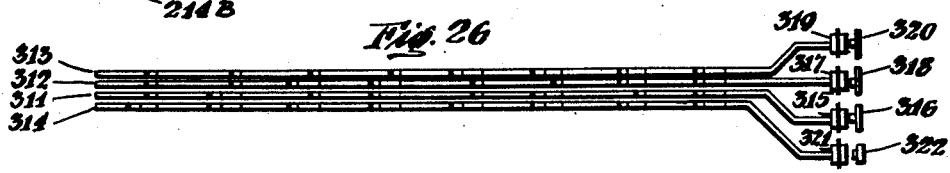
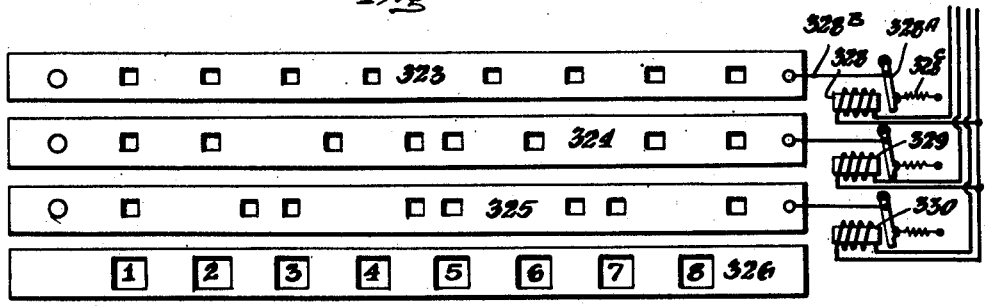
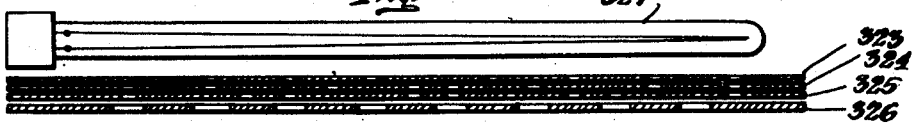

July 5, 1949.   D. R. PUTT   2,474,861
CONTROL
Filed July 1, 1940   12 Sheets-Sheet 11
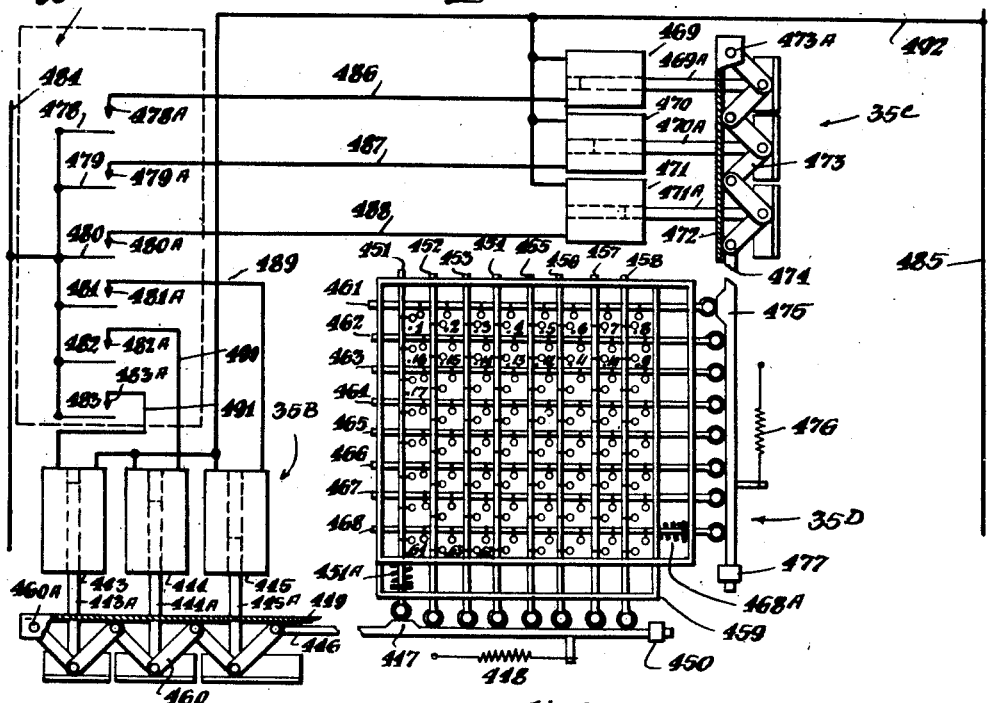
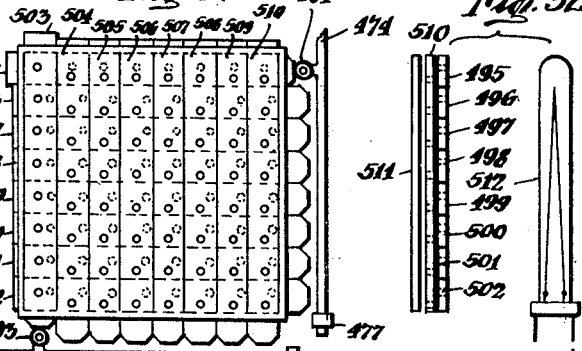
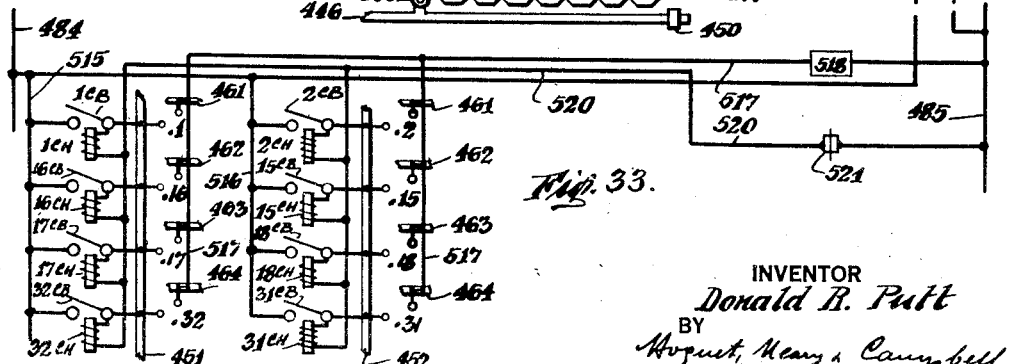
INVENTOR
Donald R. Putt
BY
August, Meary & Campbell
his ATTORNEYS July 5, 1949.　　　　　D. R. PUTT　　　　　2,474,861
CONTROL
Filed July 1, 1940　　　　　　　　　　　　12 Sheets-Sheet 12
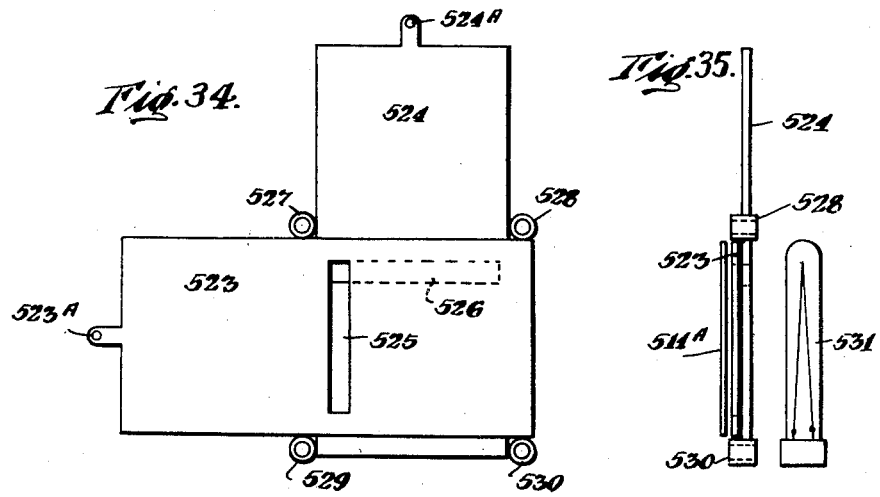
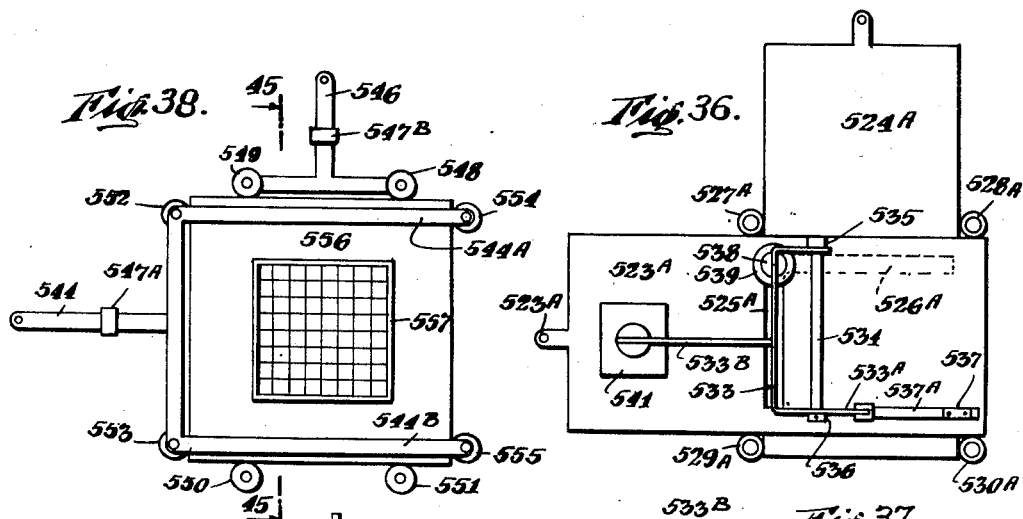
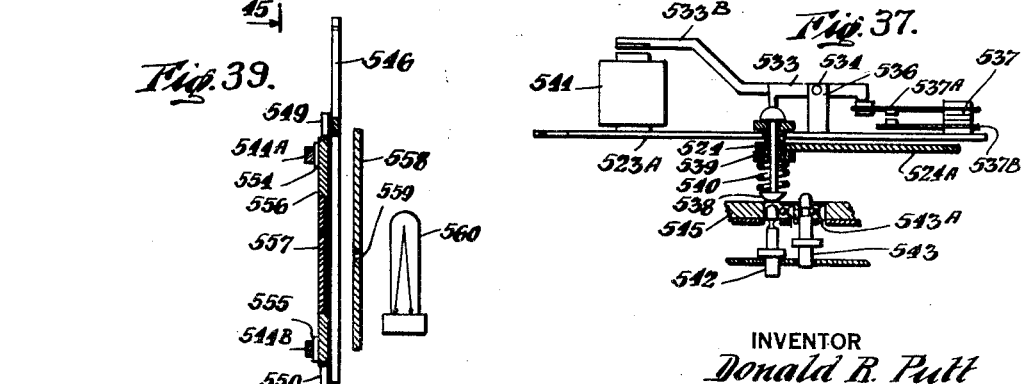
INVENTOR
Donald R. Putt
BY
August, Meury & Campbell
his ATTORNEYS Patented July 5, 1949

2,474,861

UNITED STATES PATENT OFFICE 2,474,861

CONTROL

Donald R. Putt, Jersey City, N. J.

Application July 1, 1940, Serial No. 343,400

39 Claims. (Cl. 187—29)

My invention relates to control systems, and more particularly to an improved means for automatically or selectively controlling an apparatus, or a plurality or group of these, in any desired manner.

My invention contemplates means for directing or controlling the operations of apparatuses operated by a source of motive power in which the control of the application of power depends at least in part on the position of the apparatus, and includes the generation of a different signal for each position, which signal is also indicative of such positions, which signals comprise a code, and transmitting all of the different code signals over the same system to the control for the source of power directing or controlling the steps or operations, as the case may be. My invention also includes control means of miniature size for receiving and storing control impulses from remote locations to be collected and carried out in sequence, depending upon the position of the object being controlled.

By way of example, my invention is applicable to control the operation of power-operated machines, such as gun mountings and elevators wherein the positioning of the object effects the generation of a signal different for each predetermined position and which is indicative of the particular position for which the signal is generated. The signal or signals generated by the positioning of movable objects are transmitted to a control means in a code, that is, in combinations of mechanical or electrical impulses, or combinations of consecutive spaces and impulses. As the signals are received by the control means, the signals are decoded to effect the operation or energization of the control means in accordance with the position of the objects being controlled to initiate an operation which alters such position. The signals may also be used to indicate at a remote location the position of the object being controlled.

It will be obvious that my invention is applicable to many apparatuses, but for simplicity and merely for purposes of illustration, I have illustrated my invention as applied to an elevator system, controlled manually, semi-automatic or fully automatic, and as a single car or as a unit of a bank of cars. The advantages accrued by the application of my invention to the elevator art are similar to those obtained in other arts and will be more clearly understood by first considering certain of the existing disadvantages of the prior art constructions.

Most of the elevator systems heretofore constructed have in common the following mechanisms. First, each car is provided with a selector which comprises means operated by the car to indicate to the control means the position of the car in the hatch. Second, push buttons in the hall and in the cars with which are associated means including a large number of individual locking relays for storing call impulses initiated by actuation of the car or hall buttons. Third, complex circuit and switching means associated with the position indicator for selecting and running the car in the direction determined by the first call registered at the storage means, or in accordance with action desired by the operator or dispatcher. Fourth, circuit means for stopping the car at the floors for which calls have been received. Fifth, circuit means including individual relays for resetting or releasing the locking storage relays after the car has answered the call. And sixth, secondary circuits for operating car position indicators located either in the car or hall, and also the usual hall lanterns.

It will be seen therefore that an elevator is illustrative of a machine or object in which the position of the car in the hatch is determinative of the control to be applied and that such condition must be transmitted to the control means.

In accordance with my invention, the position of the car is indicated to the control means by different combinations of signal indications or impulses which vary in character, or by different combinations generated simultaneously or in cycles of consecutive spaces and impulses. The signals may be generated mechanically, magnetically, inductively or by any other appropriate mechanical, electrical or electronic means. The car position signals are generated and transmitted from the car as a code over a greatly reduced number of wires to the control means or to car position indicators which may be remotely located with respect to the elevator car or hatch.

I also provide as a part of my invention a storage means with a scanning device which not only selects calls but also determines automatically the direction of car movement. The storage and scanning means of my invention eliminates the heretofore necessary selector mechanism of the prior art and at the same time provides a control means which is of miniature proportions.

The storage means of my invention may be mechanical or magnetic. My copending application for Electrical controls, Serial No. 269,546, filed April 22, 1939, shows several forms of magnetic storage means which are also applicable to elevator systems. The mechanical storage means of my invention is operated by a single electromagnet in response to calls to register the effect of the call in a storage device which operates directly to sense the direction in which the car is to move and to stop the car at the proper floor. In the magnetic form of storage means, the call is registered by storing magnetic flux in a magnetic storage means corresponding to the floor on which the call is received. This magnetic flux operates directly or in turn to determine the direction of movement of the car and to stop the car at the floor from which the call has been received. In scanning operations, either the scanning means or the storage means may be moved relative to the other, as exemplified by the forms of my invention to be hereinafter described.

In each form of the invention, there is a minimum number of movable parts and switching mechanism, and in the magnetic form of storage means there are no friction engaging or rubbing parts between the scanning and storage elements. The mechanical or magnetic storage forms of my invention are restored to normal by a single reset element which is so arranged as to restore the mechanical storing elements or the magnetic flux representing a registered call immediately after the call has been answered by the car.

In accordance with my invention, I also provide means for generating different signals as a code indicative of the actuated car buttons which is transmitted over a minimum number of wires to the control means remotely located with respect to the car.

The coding and decoding features of my invention provide substantial advancements over the prior art, in that a large number of floors may be serviced with a minimum number of wires between the car and the control means and for the car position indicators. Thus, while the car position may be transmitted by a code from the car to the control means, the calls initiated by the car buttons may also be conveyed by a code system from the car to the control means. The decoding means for the control means and the car position indicators may comprise several forms, a few of which are described hereinafter.

The apparatus embodying my invention has fewer parts than the constructions heretofore provided for obtaining the same or similar functions and can be made much more compact and in relative miniature proportions, while at the same time enabling more readily the control of more complicated functions and operations.

One of the objects of my invention is to provide means for directing or controlling the operations of apparatuses motivated by a source of power in which the control of the application of power depends at least in part on the condition of the apparatus, and includes the generation of a signal different for each position, and transmitting all of the signals as a code over the same system to the source of power directing or controlling the steps or operations.

Another object of my invention is to provide a control means of miniature size for receiving and storing control impulses from remote locations, which are then used for controlling the operation of a device depending upon the position of the device being controlled.

Another object of my invention is to provide means for generating signals in different combinations of impulses, either simultaneously or in consecutive order with predetermined spacing, which are indicative of the functions or operations of the apparatus to be controlled, storing the generated signals, subsequently sensing or scanning the stored signals in a predetermined and selective manner such that the reaction of the storage means or the scanning means achieves the subsequent control, and erasing the stored signals as they are answered.

Another object of my invention is the provision of signal generating and storing apparatus in which a number of wearing parts heretofore required are eliminated and the size of the apparatus materially reduced as compared with apparatus heretofore proposed for carrying out the same or similar functions.

An additional object of my invention is to provide a system in which the call storage means, the selector, and the call reset means are combined into a single physical and operative unit, thereby eliminating the many parts, extensive wiring circuits, and complicated installations heretofore necessary.

Another object of my invention is to provide a control means for elevator systems or the like adapted to receive signals transmitted as a code which are indicative of the car position and/or hall button actuated over a minimum number of wires, storing the call signals and operating a scanning means in response to the car position signals to sense stored calls and thereby determine the direction of movement of the car and to stop the car at the floor for which the call is intended.

Another object of my invention is to provide a control system for elevators which materially reduces the number of wires between the car and the control means or the car position indicators.

Another object of my invention is to provide a control means for an elevator system which is of miniature size and comprises relatively few moving parts which are adapted to be initiated by a call to determine the direction of movement of the car, to receive and store additional calls and subsequently cancel all calls registered in the direction of car movement as they are answered by the car.

Another object of my invention is to provide a control means for a bank of elevator cars which eliminates the heretofore elaborate cross connections and bulky control means, provides for storing all calls received from the floors serviced and directs the car nearest the floor from which the call is received to stop at that floor without affecting the operation of the other cars.

A further object of my invention is to provide for the formation of the code signals by means on the elevator car and in the hatch that are in either or both conductive or inductive relation.

A further object of my invention is to provide means for generating one or more signals to be transmitted simultaneously as a code over the same system (multi-element single position), the presence or absence of one or more signals in one or more parts of the system at given different times indicating the different conditions of the apparatus being controlled, and utilizing these code signals to control the apparatus.

Another object of my invention is to provide a call storage system in which a single electromagnet is used to store any amount of calls from different floors, irrespective of their number, thereby eliminating the prior art necessity of a relay for each floor.

Still a further object is to make provisions in the call storage system to reset any amount of stored calls with one electro-magnet, when the calls have been answered, thereby eliminating the contacts on the selector for each floor for resetting the relays as used in the prior art.

A further object of my invention is to provide a control in which different code signals are formed corresponding to the different conditions of the thing to be controlled and to utilize these code signals in achieving the control as well as to operate an indicator illustrating the condition of the thing being controlled.

A more particular object of my invention is to achieve any of the above objects in connection with the construction and operation of elevators, position controls and similar devices.

Other objects and advantages of the invention will become apparent upon consideration of the following detailed description of the several embodiments of the invention taken in conjunction with the accompanying drawings, in which:

Figure 1 is a view illustrating diagrammatically one embodiment of a mechanism for generating code signals applicable to an elevator system;

Figure 2 is a schematic illustration of an extended arrangement of code signal generating mechanism for servicing twice the number of floors represented in Figure 1;

Figure 3 is a view in vertical elevation of a form of mechanism operable with the constructions illustrated in Figures 1 and 2 to generate impulses or movements the summation of which differs for each floor represented;

Figure 4 is a view in side elevation of the mechanism illustrated in Figure 3;

Figure 5 is a plan view of the mechanism illustrated in Figures 3 and 4;

Figure 6 is a schematic representation of a form of control means which includes a storage device, a call registering mechanism and a scanning device operable in response to calls registered in the storage device for controlling the operation of the car;

Figure 7 is a view in end elevation of the mechanism illustrated in Figure 6;

Figure 8 is a sectional view taken along lines 8—8 of Figure 6;

Figure 9 is a schematic wiring diagram for an elevator including such mechanism as illustrated in Figures 1 to 8;

Figure 9a is a wiring diagram for car and gate motors which are controlled by the mechanism illustrated in Figure 9;

Figure 10 illustrates a modified form of call registering mechanism including means mechanically actuatable by the car buttons;

Figure 11 is a fragmentary view of the call registering mechanism of Figure 10 taken substantially along lines 11—11;

Figure 14 is a schematic illustration of a modified form of a means for generating code signals;

Figure 15 is a side view of a de-coding device for converting electrical code impulses into mechanical impulses or movement;

Figure 15a is a side view of an alternative form of a de-coding device;

Figure 16 is a schematic illustration in plan of another form of a means for generating code signals utilizing magnetism as the actuating force;

Figure 17 is a view in side elevation of the system illustrated in Figure 16;

Figure 18 is a schematic illustration of a further form of a means for generating code signals;

Fig. 18a is a schematic illustration of a complete embodiment of the invention;

Fig. 18b is a side view of a portion of the apparatus shown in Fig. 18a;

Figure 19 is a schematic diagram illustrating electrical circuits for a car position indicator controlled by a form of a mechanism for generating code signals;

Figure 20 is a plan view of a switch arrangement adapted to be operated by a de-coding device to control means for indicating the position of the car;

Figure 21 is a sectional view of the switch mechanism taken along lines 22—22 of Figure 20;

Figure 22 is a view in elevation of the right side of Figure 21;

Figure 23 is a schematic illustration of another form of position indicator operable in response to a mechanism for generating code signals and controlled by variations of current corresponding to the position of the car;

Figure 24 is a view in side elevation of a push button, a device for generating code signals;

Figure 25 is a fragmentary view of a side elevation of several code bars employed in the push button, a device for generating code signals;

Figure 26 is a plan view of the bars of Figure 25 assembled;

Figure 27 is a view in plan of several shutters of a light indicator disassembled to show the relation of the openings;

Figure 28 is a sectional view of the shutters of Figure 27 shown in coactive relation with respect to a numeral dial and lamp;

Figure 29 is a diagrammatical illustration of a form of decoding means for large installations;

Figure 30, 31 and 32 show a form of car position or condition indicator of the shutter type which is adapted to be operatively connected to the decoding means of Figure 29, Figure 30 showing a plan of a transparent numeral panel, Figure 31 showing the shutter arrangement in plan, and Figure 32 showing a side view of the assembled indicator;

Figure 33 is a fragmentary schematic illustration of a form of car button arrangement of the magnetic "stick" type which is adapted for association with the decoding means of Figure 29;

Figure 34 is a diagrammatical illustration of another form of indicator utilizing the shutter principle;

Figure 35 is a view of the right hand edge of the indicator shown in Figure 34 in association with a lighting means;

Figure 36 is a diagrammatical illustration of the rear side of a form of mechanical "stick" car button panel also adapted for operation with the decoding means of Figure 29;

Figure 37 is an edge view partly in section of the form illustrated in Figure 36;

Figure 38 is a diagrammatical illustration of another form of position or condition indicator which is adapted for operation with the decoding means of Figure 29;

Figure 39 is a view of the right hand edge of the indicator shown in Figure 38 in association with a lighting means;

Figure 12:
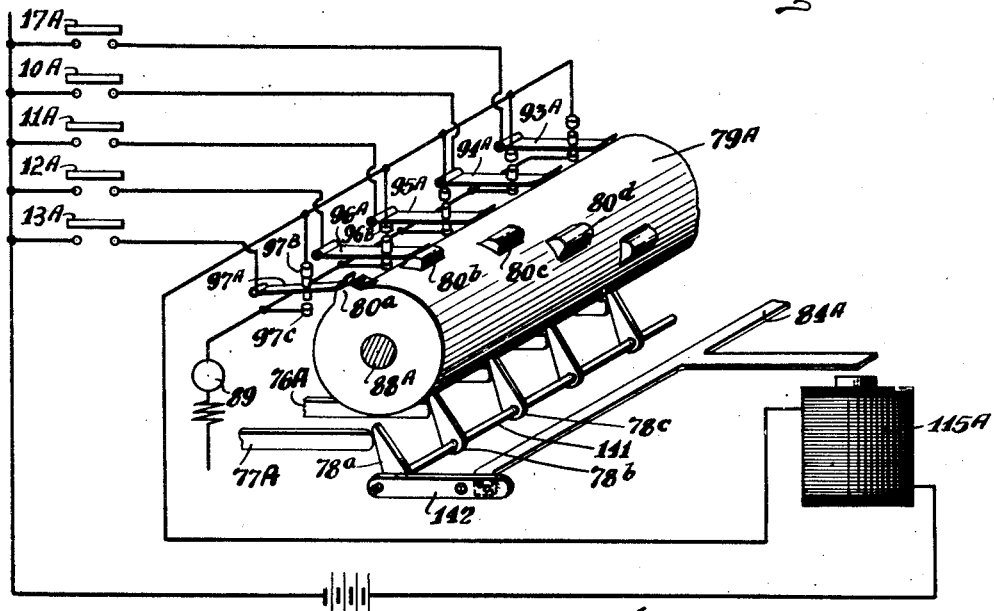
Figure 12 is a schematic illustration in perspective of another form of call registering mechanism.

Referring to the drawings, one form of mechanism for generating code signals applicable to an elevator system is shown diagrammatically in Figure 1. The elevator car 1 may be power driven by the usual cable arrangement 4 including a counter weight 3, an electromagnetic brake 5 provided with shoes 6 and 7 and a driving motor 8. The elevator system illustrated in Figure 1 is shown applied to an eight-story building, the floors 1F to 8F being provided with the usual push buttons 10—17, respectively. The elevator car is provided with the usual push button panel 18, a car position indicating device 19, and the usual gate 20 controlled by a motor 9.

The code signal generating mechanism illustrated in Figure 1 comprises cams 21 to 36, the cams being arranged in a different combination at each floor. The elevator is provided with three cam followers 37, 38 and 39 for cooperation with the cams 21 to 36 during movement of the car to generate a code of signal indications, the code being determined by action of the cams upon the followers as the car approaches or passes each floor.

For example, during an upward trip of the car, the follower 39 being in a left hand position at floor 1F is shifted from the left hand position to a right hand position by the cams 22, 28, 33 and 36 and from the right hand position to the left hand position by the cams 24, 31 and 35. The follower 38 being in a left hand position at floor 1F is moved from the left hand position to a right hand position by cams 25 and 34 and from right hand position to left hand position by cam 30. The follower 38 is, therefore, in a left hand position at floors 1F, 2F, 5F and 6F and in a right hand position at floors 3F, 4F, 7F and 8F. The follower 37 is actuated only by cams 26 and 29, the follower assuming a left hand position for floors 1F to 4F and a right hand position for floors 5F to 8F. The followers 37, 38 and 39 thus assume a different combination of positions for each floor as the elevator reaches or passes the floors.

The different combinations of positions assumed by the followers 37, 38 and 39 in servicing eight floors, regardless of the direction of movement of the elevator car, are indicated in the following table:

*Table No. 1*

| Car Position | Follower 37 | Follower 38 | Follower 39 | Index position of Bar 54 |
|---|---|---|---|---|
| 1 | Left | L | L | 1 |
| 2 | do | L | R | 2 |
| 3 | do | R | L | 3 |
| 4 | do | R | R | 4 |
| 5 | Right | L | L | 5 |
| 6 | do | L | R | 6 |
| 7 | do | R | L | 7 |
| 8 | do | R | R | 8 |

The same code signal generating system may be applied to a larger number of floors by merely adding one or more cam followers and the necessary additional cams, depending upon the number of floors, in the order of a permutation. For example, in Figure 2 a code signal generating arrangement of cams is provided for only four cam followers to service a building having sixteen floors. Thus, by the mere addition of the one follower, the number of floors is doubled. Should five followers be used, the number of floors serviceable would be 32, and should six followers be provided, 62 floors could be served, and so on.

As previously pointed out, the code signal generating feature of the invention not only provides for the reduction in size of the control means, but also materially reduces the number of wires heretofore required between the car and the control means or car position indicator. For example, where the cam followers of the invention are employed to actuate switches (see Figure 19) the number of wires necessary to convey the position of the car to the control means or car position indicator for an eight-floor elevator is four; for sixteen floors only five; for 32 floors only six; for sixty-four floors only seven, and so on.

In constructions heretofore provided for the same character of installation and purpose, a number of wires equal to the number of floors serviced plus one additional wire was required. Thus, for sixty-four floors, 65 wires were required for systems heretofore constructed. This comparison, however, does not take into consideration other necessary wiring such, for example, as is needed for push buttons or car position indicators mounted within the car, which in prior constructions required wires corresponding directly in number to the number of push buttons and number of car stops to be indicated. As hereinafter described, my invention will be shown to provide for a material reduction in the wiring heretofore necessary for the car push buttons, hall lanterns, dispatchers, and car position indicators.

While the different combinations of positions assumed by the cam followers 37, 38 and 39 may be used to generate a code of electrical impulses, as described heretofore, they may also be utilized to operate a positioning device by direct mechanical coupling for movement in synchronism with the movement of the elevator car. The mechanical system is particularly adapted to a situation where it is desirable to have the control means mounted on the elevator car.

Referring to Figures 3, 4 and 5 of the drawings, a mechanism is shown for mechanically receiving the different signals generated by the cam and follower arrangement illustrated in Figure 1. The follower arms 37, 38 and 39 are in the form of bell cranks pivotally mounted on a frame member 47. As the rollers 37A, 38A and 39A engage their respective series of cam elements during the travel of the elevator car, the followers 37, 38 and 39 are actuated to reciprocate the rods 40, 42 and 44 which carry cams 41, 43 and 45 in accordance with the positions assumed by the followers. The rods 40, 42 and 44 are held in operative relation by a guide member 46. The height or extent of the inclination of the cam surface of the cams 41, 43 and 45 is varied so that the movement of cam 45 may be regarded as one unit, while the cam surface of cam 43 is in the order of two units and the cam surface of cam 41 is in the order of four units.

The summation of the movements of the cams 41, 43 and 45 for the different combinations of positions assumed by the followers 37, 38 and 39 is transmitted to an expansible mechanism comprising preferably a series of pivotally connected links 48 to 53. (See Figures 4, 5 and 6.) The end link 48 is anchored by a pin 56 to a stationary guide 55 while the opposite end link 53 is pivotally connected to a reciprocable bar 54. As shown in Figure 5, the cams 41, 43 and 45 are arranged to engage the link mechanism at the pivotal connections 48A, 50A and 52A, respectively, for transmission of the cam movements to the bar 54, a spring 54A (Fig. 6) being provided to bias the bar 54 to maintain the link mechanism in operative engagement with the cams. If desired, the cams may be arranged to positively operate the link mechanism in each direction in a push-pull manner, thereby eliminating the necessity of a spring.

From the foregoing, it will be readily apparent that the movement of the follower 39 from a left hand posiiton to a right hand position will actuate the cam 45 to depress the links 52, 53 one unit and thereby move the bar 54 a corresponding amount. A left to right movement of the follower 38 likewise actuates the links 50, 51 to move the bar 54 an amount corresponding to two units, and a movement from left to right of the follower 37 will cause the cam 41 to depress the links 48, 49 to move the bar an amount corresponding to four units. The resultant movement of the bar 54, therefore, is equivalent to an amount corresponding to the summation of cam actuated link movements for each floor position. For example, a continued upward movement of the elevator car will effect a series of different combinations of cam follower positions to cause the cams 41, 43 and 45 to move the bar 54 to consecutive positions, as indicated in Table No. 1.

Referring to Figure 6, a form of control means is illustrated which may be located on either the elevator car, at the bottom or top of the hatchway, or at some remote location, if desired. This form of control means is also adaptable for response to mechanical movement, such as provided by the mechanical code signal generating mechanism illustrated in Figures 1 to 5 or in connection with electrical code impulses, such as contemplated where the followers are provided with switch contacts (see Fig. 14).

The control means comprises a compact arrangement of parts including a call storage and scanning mechanism 6A, a mechanism 6B for registering incoming calls with the storage means and a time delay mechanism 6C which cooperates with the scanning mechanism to delay the movement of the elevator car a period sufficient for passengers to get on and off the car. The call registering mechanism 6B may be operated from the push buttons, either in the car or in the hall, or both. The control mechanism is so constructed that the first call received by the storage and scanning mechanism determines the direction of movement of the car. The mechanism may also receive other calls during the movement of the elevator car in response to the first call, the mechanism operating to stop the car en route at any floor from which subsequent calls are received, providing said calls may be reached by continuing the direction of travel established by the first call, this direction of travel being maintained until all calls in that direction are answered, as described in more detail following the description of Figures 9 and 9A.

Referring more particularly to the detailed construction of the control mechanism, the storage device 140 comprises a plurality of mechanically shiftable pins 70 to 77 corresponding directly to the number of floors to be serviced. The push buttons of the car or hall may be connected by appropriate wiring to corresponding series of switch contacts 90 to 97, respectively. If the car push buttons are also provided, they may be connected in parallel with the hall push buttons, thus permitting calls to be made from either the car or the respective floors.

The call registering mechanism 6B comprises, in addition to the switch contacts 90 to 97, a reciprocable bar 79 mounted in guide members 80 and 81 and pivotally connected to a link 86 driven by a crank 87 secured to the shaft 88 of the motor 89. Pivotally carried at 82 on the reciprocable bar 79 is a call registering member 78 in the form of a bell crank, one arm of the bell crank being adapted to engage the pins 70 to 77 while the other arm is provided with a roller 83 for engagement with an armature 84 of an electromagnet 115. The armature 84 is pivoted at 85 (Fig. 7) and held in retracted position against a bracket 116 by a spring 117. The member 78 is resiliently held in a retracted position with the roller 83 against the armature 84 by a spring 78A. Also mounted on the bar 79 is a switch actuating arm 98 which is adapted to engage the switch contacts 90 to 97 to operate the same during the reciprocation of the bar 79. Thus, during energization of the motor 89, the call registering member 78 and the switch engaging arm 98 are reciprocated back and forth adjacent the storage pins 70 to 77 and the switch contacts 90 to 97, respectively.

The scanning mechanism associated with the storage device 140 comprises an expansible link mechanism, such as illustrated in Figures 4, 5 and 6. As the link mechanism receives the code signal impulses, whether generated mechanically or electrically, it will operate to move the bar 54 to the index positions corresponding to the position of the elevator in the hatch. The bar 54 includes a shaft-like portion 58 bounded at each end with bearings 59 and 60 to pivotally support a pair of direction levers 61 and 63 and a stop lever 62 interposed therebetween.

The direction lever 61 may be provided with a shoe 61A for slidably engaging a switch lever 64 pivotally mounted on a rod 99 supported in bearings 100 and 101. The actuation of the direction lever 61 is thus arranged to operate a switch 67 for controlling the direction of movement of the elevator car, that is, should the lever 61 be actuated by a storage pin, the direction of movement of the car in answer to the call would be in a downward direction. The stop lever 62 may likewise be provided with a slidable shoe 62A for actuating a switch lever 65 operatively connected to a switch 69 for stopping the elevator at the floor from which the call was received. The direction lever 63 which controls the upward movement of the elevator is likewise provided with a switch actuating shoe 63A which engages an arm 66 of switch 68. The switches 67, 68 and 69 are shown in elevation one above the other in Figure 7, to better illustrate the several contacts.

To reset the stop lever 62 and thus return the storage pin to normal position after a call has been answered by the elevator, an electromagnet 118 may be operatively associated with the lever 62 and controlled by the time delay device 6C.

The time delay device 6C comprises a reduction gearing indicated generally at 104 in driving relation with the motor 89. A shaft 114 is operatively connected to the reduction gearing to drive a time cylinder 108 which carries a group of reciprocable pins 111. Associated with the cylinder is an electromagnet 109 having an actuating armature 110 past which the pins are rotated. When the electromagnet 109 is energized by operation of the stop switch 69, the armature 110 is actuated to bring the cam surface 110A into engagement with the pins so as to force the pins axially of the cylinder 108, as shown at 112 (Figure 8), where they remain until they are returned by engaging a cam 113 mounted upon the housing of reduction gearing 104. Adjacent the end of the cylinder 108 opposite from the actuating armature 110 is a pivoted switch actuating member 106 which is connected by insulation 107 to operate a switch 105.

The cylinder 108 may be adapted to rotate at a given rate, such as one revolution per minute, while the electromagnet 109 is adapted to be energized until the switch 105 is operated. Since the switch 105 is not operated until the first pin 111 has been depressed by the armature 110 and revolved substantially 180 degrees, as shown at 112, a period of one-half a minute will elapse before the magnet 109 is deenergized. This period will give the armature 110 sufficient time to actuate as many as five pins. The switch 105 will thus be moved and held to the right as viewed in Figure 6 for an interval of one-half minute after the electromagnet 109 has been energized. As described in greater detail hereinafter, the switches 69 and 105 are arranged to control the opening and closing of the elevator gate, the resetting of the stop lever 62 and the storage pin corresponding to the floor at which the elevator has been stopped.

Briefly, without reference to the electric wiring, the operation of the control means is as follows:

Assuming that the push button 12 at the floor 3F (Figure 1) has been momentarily actuated, the car being at rest at floor 1F, the motor 89 would be energized to quickly actuate the reciprocable bar 79 to move the call registering member 78 and the switch actuating arm 98 back and forth across the storage pins 70, 77 and the switch contacts 90, 97, respectively. As the arm 98 operates the contact 92, which is in series with the switch 12, it completes a circuit to energize the electromagnet 115, causing the armature 84 to swing to the right, as viewed in Figure 7. This movement forces the member 78 clockwise to depress the storage pin 72 corresponding to the push button 12. The depression of the pin 72 actuates the direction lever 63 to operate the switch 68. The switch 68 completes circuits, hereinafter described, to effect the closing of the elevator gate and initiate an upward movement of the elevator car toward floor 3F. As the elevator moves from the first floor and approaches or passes floor 2F, the follower 39, (Figures 1, 3 and 5) is shifted to the right, thereby depressing the links 52, 53, by the actuation of the cam 45 to move the scanning device, including levers 61, 62 and 63, one step across the storage device. This movement of the scanning device will move the stop lever 62 opposite the pin 71. Since the pin 71 has not been depressed, the elevator will continue upward and as the elevator arrives at floor 3F corresponding to push button 12, the follower 39 will be shifted to the left to remove the effect of the cam 45 from the link mechanism, the follower 38 being simultaneously shifted to the right to cause the cam 43 to depress links 50, 51 a distance corresponding to two units, thereby effecting the movement of the scanning device an additional step to bring the lever 62 opposite the pin 72. The pin 72 having been depressed by the call registering member 78, will pivot the lever 62 about the shaft 58 to operate the switch 69. The direction lever 63 being released for return movement to normal position, the operation of the switch 69 and the associated controls, deenergizes the elevator motor 8, sets the brake 5, opens the elevator gate 20, and energizes the magnet 109 and the motor 89 to start the time delay device 6C. Energization of the electromagnet 109, as previously described, operates to depress the pins 111 as the cylinder 108 is revolved. One-half minute after the switch 69 has been operated, the switch 105 is actuated by the first pin 111 depressed by the magnet 109, as indicated at 112 in Figure 8, thereby deenergizing the electromagnet 109 and energizing the reset electromagnet 118 whereby the switch 69, lever 62 and pin 72 are all returned to normal position. The system, however, is not placed in condition to answer calls until another one-half minute has elapsed, that is, until the last depressed pin 111 has passed the arm 106 and permitted the switch 105 to return to normal position. A period of substantially one minute is thereby provided for the car gate to open and for passengers to get on and off the car before the gate will again close in response to additional calls.

Referring to Figures 9 and 9A, a schematic wiring diagram is shown applied to the mechanism illustrated in Figures 1, 3, 4, 5 and 6. The wiring diagram shows, for purposes of brevity, the hall push buttons 10 to 17 only, it being understood that the car buttons or other desired control buttons may be connected in parallel with the hall buttons. For an understanding of the automatic operation of the elevator system, an operation will be followed in detail answering, first, a call at the third floor by actuation of push button 12, then a call made by a passenger upon entering the car by pressing the car push button corresponding to the hall button 10, and finally, a call made by the hall push button 11 prior to the arrival of the elevator car at the second floor on its trip in answer to car button 10.

The push button 12 upon being actuated while the elevator car is at rest at floor 1F energizes the motor 89 by establishing a circuit between the main leads 149 and 150 through button 12, movable contact 92, plate contact 103, wire 151, motor 89 and wire 152. The motor 89 being energized actuates the call registering mechanism including the storage pin actuating member 78 and the switch actuating arm 98 (Figure 6), whereby the movable contact 92 is operated by the arm 98 to establish a circuit through the push button 12, movable contact 92, plate contact 102, wire 153, electromagnet 115 and wire 154 to the main lead 150. The energization of the electromagnet 115 actuates the armature 84 to cause the member 78 to force the storage pin 72 to the right, as viewed in Figure 6, thereby actuating the direction lever 63.

The motor 89 preferably operates at such a speed as to effect a complete scanning operation across the contacts 90 to 97 by the switch actuating arm 98, while button 12 is momentarily held down.

Referring to the direction controlling relay UD, it is to be understood that this relay is so polarized by a continuously energized winding UDP as to maintain the movable contact UDA in the position last assumed until the current has been reversed in the relay UD. Thus, when the relay UD is once energized, the movable contact UDA will be actuated to assume the position corresponding to the direction in which the elevator is called. The contact UDA remains in such position until all calls in the direction of car movement have been answered.

The direction lever 63 having been actuated clockwise by the pin 72, as viewed in Figure 7, operates the switch 68 to close the contacts 68A—B and 68C—D and opens the contacts 68D—E. The closing of the contacts 68C—D, established a circuit through the wire 155, contacts 67E—D, relay UD, contacts 68D—C and wire 156. The energization of the relay UD closes the switch contacts UDA—B to establish a circuit including the wire 157, contacts 105D—E, wire 158, contacts 69D—E, wire 159, contacts UDA—B, wire 160, contacts 68B—A, relay U, an up limiting switch UL, wire 163, the hall door switch DR and wire 164. The relay U being energized, actuates switches U1, U2 and U3.

However, if the direction lever 61 had been actuated by a storage pin instead of the lever 63, the down directing switch 67 would be operated. An operation of the switch 67 would effect the closing of contacts 67A—B and 67C—D and the opening of contacts 67D—E. Such an operation would therefore provide for the reverse flow of current through the direction controlling relay UD since the relay circuit would then be through wire 155, contacts 68E—D, relay UD, contacts 67D—C and wire 156. Energization of the relay UD by actuation of the switch 67 would thereby actuate the movable contact UDA to engage the stationary contact UDC. This would establish a circuit through contacts UDA—C, wire 165, contacts 67B—A, down relay D, down limiting switch DL, and wire 168. The up and down limiting switches UL and DL are safety switches which prevent the movement of the elevator beyond certain predetermined limits.

Should the control lever 61 be actuated by a call at a floor below the elevator during the movement of the elevator in an upward direction, the opening of switch contacts 67E—D and the closing of switch contacts 67D—C would operate to open the circuit to the relay UD. The relay UD being polarized by the winding UDP will, however, maintain the movable contact UDA in the position assumed in response to the prior actuation of the direction lever 63. It is thus apparent that the first circuit closed by the direction levers 61 and 63 determines the direction of movement of the elevator until all calls in the direction of the first call have been answered.

Referring back to the actuation of the direction lever 63 in response to the call at floor 3F and the resulting energization of the up relay U, the circuits established by actuation of the switches U1, U2 and U3 operate to initiate upward movement of the elevator car. The closing of switch U1 established a circuit through wire 169, an emergency stop switch Stop, wire 170, gate closing limit switch CL, gate closing control relay CR, switch OR3, wire 174, switch U1, wires 175, 176 and 168, door switch DR and wire 164. The relay CR closes contacts CR1 and CR2, thereby applying current from the lines L1, L2 and L3 (Figure 9A) to energize the gate motor 9, thus closing the car gate preparatory to the upward movement of the elevator car. During the closing of the elevator car gate, the door limit switch OL associated therewith will be closed to prepare a circuit through wire 191, switch OL, wire 192, relay OP, wire 194, switch BR2 and wires 196 and 197. The relay OP will be energized when the relay BR is energized to start the car, the relay OP operating to actuate switch OP1 to provide a holding circuit for the relay OP so that the deenergization of the relay BR will not deenergize the relay OP.

When the gate is finally closed, the gate closing limit switch CL is opened deenergizing the relay CR to thereby open switches CR1 and CR2 and deenergize the gate motor 9. The closing of the gate also closes a gate switch Gate, thereby energizing the relay BR which opens switch BR1 and closes switches BR2, BR3, BR4 and BR5. The closing of the switch BR3 energizes the electromagnetic brake 5 to release the action of the brake shoes 6 and 7 (Fig. 1). At the same time a closing of switches BR4 and BR5, switches U2 and U3 having been closed by the energization of relay U operate to energize the elevator motor 8 to move the elevator in the upward direction.

When the car approaches or passes floor 2F, the combination of positions assumed by the followers 37, 38 and 39 will be left-left-right and the bar 54 will be moved in response to this combination to move levers 61, 62 and 63 so that stop lever 62 will be opposite the pin 71. The pin 71 not having been depressed, the elevator car will continue upward and as the car arrives opposite floor 3F, the followers 37, 38 and 39 will assume the positions of left-right-left, thereby actuating the bar 54, as previously described, to move the levers 61, 62 and 63 an additional step, bringing the stop lever 62 opposite the pin 72. This movement of the bar 54 moves the lever 63 out of engagement with the pin 72 permitting the lever 63 to return to normal position. The return of the lever 63 to normal position operates the switch 68 to open contacts 68A—B and 68C—D and to close contacts 68D—E. This operation deenergizes the relay UD as well as the up relay U and the relays BR and CR, the gate opening relay OR thereby being energized.

The actuation of the stop lever 62 by the pin 72 operates switch 69 to close contacts 69A—B and 69C—D and to open contacts 69D—E. The opening of contacts 69D—E also effects a second opening in the circuit of the up relay U, the operation of switches 68 and 69 being substantially simultaneous. The deenergization of the up relay U opens switches U2 and U3 (Fig. 9A) to deenergize the elevator motor 8. The opening of switch U1 breaks the circuit to the relay BR, thereby opening switch BR3 to deenergize and set the electromagnetic brake 5. The elevator car is thus stopped and held in position at floor 3F.

The opening of the relay BR and relay CR provides a circuit through wire 191, door limit switch OL, wire 200, relay OR, switches CR1, BR1, wire 194, switch OP1 and wires 199 and 197. The energization of the relay OR closes the switches OR1 and OR2 to energize the gate motor 9 and thereby open the car gate. The switch OL is opened as the gate reaches full open position, thereby breaking the circuit to the relays OP and OR to deenergize the gate motor 9.

Operation of the stop switch 69 (Figures 6 and 7) closes contacts 69A—B to provide a circuit through wire 185, contacts 69A—B, wire 186, contact plate 103, wire 151, motor 89 and wire 152 to energize the motor 89 and drive the reduction gearing 104 of the time delay mechanism 6C. The closing of contacts 69D—C energizes the electromagnet 109 to actuate the armature 110 to depress by cam surface 110A the pins 111 as they are moved past the armature 110. The operation of the time delay mechanism, as previously described, actuates the switch 105 approximately one-half minute after the operation of stop switch 69. The operation of switch 105 closes contacts 105A—B and 105C—D and opens contacts 105D—E in which position the contacts remain until the last depressed pin 111 has passed the arm 106. The closing of contacts 105A—B upon the initial operation of the switch 105 energizes a reset electromagnet 118 to return the switch 69, the stop lever 63 and the storage pin 72 to normal position. The up relay U, however, remains deenergized since contacts 105D—E are now open.

Referring to Figure 9, the opening of switch contacts 105D—E deenergizes the electromagnet 109 to permit the retraction of armature 110 after five of the pins 111 have been depressed. The closing of contacts 105C—D provides a holding circuit through wire 157, contacts 105C—D and wires 190, 186, 103 and 151 for motor 89. By maintaining the motor 89 energized the time cylinder 108 is rotated until the last depressed pin 111 has passed the arm 106, whereupon the switch 105 is permitted to return to normal position. Since it requires substantially one-half minute for the effect of the energization of the electromagnet 109 to operate the switch 105 and another one-half minute before the last depressed pin passes the arm 106 and thereby permit the switch 105 to return to normal position, a period of substantially one minute is provided during which the elevator gate is opened and sufficient time allowed for the passengers to get on and off the elevator car.

The return of the switch 105 to normal position opens contacts 105D—C and closes contacts 105E—D, thereby deenergizing the motor 89 and simultaneously reconditions the circuits for the relay U or D. Should additional calls be registered the system will now be ready to answer the same. The opening of contacts 105A—B operates to deenergize the reset magnet 118.

The elevator car is now at floor 3F with the elevator gate open. Assuming that a passenger entering the car at the third floor pushes the car button for the first floor, the following operations will take place. The motor 89 will be energized by current flowing through the circuit including the push button 10, movable contact 90, plate contact 103 and wire 151 to motor 89. Energization of the motor 89, will as before, actuate the call registering mechanism moving the members 78 and 98 back and forth across the storage pins 70 to 77 and switch contacts 90 to 97 so that the electromagnet 115 may be energized by the engagement of switch contact 90 with the plate contact 102 to cause the armature 84 to move the member 78 clockwise and depress the pin 70. The depression of the pin 70 actuates the direction lever 61 to operate the switch 67. The opening of switch contacts 67E—D and the closing of contacts 67D—C provides for the flow of current through the direction controlling relay UD to cause the movable contact UDA to engage the contact UDC thereby energizing the down relay D through wire 165, contacts 67B—A, relay D, down limiting switch DL, wire 168 and hall door switch DR. The energization of the down relay D closes the switch D1 to energize relay CR which in turn closes switches CR1 and CR2 energizing the gate motor 9 to close the car gate. When the gate closes, the switch gate will be operated to provide a circuit through the relay BR, thereby energizing the electromagnetic brake 5 and applying current to the elevator motor 8 to start the motor downwardly toward the floor 1F.

Should a person on the second floor push the button 11 prior to the passing of floor 2F by the elevator car, the motor 89 will be energized storing the call by depressing pin 71. As the car approaches or arrives at the second floor, the cam followers 37, 38 and 39 will assume a left-left-right position, thereby actuating the link mechanism to retract the levers 61, 62 and 63 crosswise of the storage device to bring lever 62 opposite the pin 71. Pin 71 having been depressed will actuate the lever 62 to operate switch 69. The operation of switch 69 opens contact 69D—E and closes contact 69D—C and contact 69A—B, deenergizing the down relay D and energizing electro-magnet 109 and motor 89 of the time delay mechanism 6C. The deenergization of relay D opens relay BR to deenergize the elevator motor 8 and actuate the brake 5 to stop and hold the car in position at floor 2F. The operation of the switch 105 deenergizes the electromagnet 109 and energizes the reset electromagnet 118 to reset the switch 69 and the pin 71. The relay BR having been deenergized by the deenergization of the down relay D operates to energize the relay CR and thereby start the gate motor 9 to open the car gate.

The elevator system having had a call to the first floor, the system will continue to operate after the time delay period provided by the timing device 6C. For instance, when the lever 106 is permitted to return to normal position by the last depressed pin 111, the switch 105 will operate to close the circuit through the down relay D, the contacts 69D—E having been closed by the resetting of the switch 69. The down relay D being again energized in turn energizes the relay CR to close the circuit to the gate motor 9 for the purpose of closing the car gate. When the gate is completely closed, the relay BR will be energized to thereby energize the elevator motor 8 and cause the brake 5 to release the cable for the downward movement of the car.

When the car arrives at the first floor, the cam followers 37, 38 and 39 will all assume a left-hand position thereby retracting the bar 54 so as to bring the stop lever 62 opposite the depressed pin 70. The pin 70 operates the switch 69 through the lever 62 to open the circuit to the down relay D which in turn opens the relay BR. The elevator motor 8 and the brake 5 are thus deenergized to stop and hold the elevator car in position at floor 1F. The time delay mechanism 6C is again operated by the operation of switch 69 to provide a delay period during which passengers may get on and off of the elevator car before the car is permitted to answer another call.

Since the direction controlling relay UD remains polarized during operation of the elevator, calls registered from floors above the car while the car is moving in a downward direction will not affect the movement of the car until the car has answered the lowermost registered call, after which the movement of the car will be reversed, moving upwardly and continued in the upward direction until it has answered the highermost registered call. It will also be evident that the car will stop for all calls registered in its path of travel.

While the car buttons and hall buttons may be connected in parallel for actuating the storage pins, it may be desirable, where the control means is located on the car, to arrange the car buttons to mechanically actuate the storage means. A construction to accomplish this includes the electromagnet 115 operable to actuate the storage pins in response to hall button calls, as described in connection with Figs. 6 and 7, together with an arrangement of car buttons and levers for independently actuating the storage pins as shown in Figs. 10 and 11. Interposed between the path of movement of the member 78 and the storage pins 70 to 77 are a series of levers 130 to 137, one for each storage pin, pivotally supported on a rod 128 with spacers 129 therebetween. The car buttons 120 to 127 are reciprocatably supported in frame member 138 and 139. Each push button is provided with a spring, such as 120a, for retracting the push button when released. The actuation of a car push button operatively engages the associated lever, as indicated in Fig. 10, to actuate a corresponding storage pin in the storage device 140. Should a call be made by actuation of a hall button, the armature 84 will operate at the proper positioning of the member 78 to move the member against one of the levers and depress the proper storage pin.

Another form of mechanism which may be provided for registering the calls in the storage device 140 is illustrated in Fig. 12. In this form, the reciprocating member 79 of Fig. 6 has been replaced by a rotary cam 79A which is adapted to be directly driven by the motor 89. The rotary cam 79A is provided with a plurality of projections, such as 80a, 80b, 80c, etc., arranged axially and spaced at points radially of the cam. Switches 90A to 97A corresponding to the switches 90 to 97 of Fig. 6 are adapted to be operated serially by the cam projections 80a, 80b, 80c, etc. The switch arm 97A, for example, is operated by the projection 80a to disengage the contact 97C of the circuit to the motor 89 and engage the contact 97B of the circuit to an electromagnet 115A. Provided adjacent the cam surface is a knife bar 141 pivotally supporting a series of knives, such as 78a, 78b, 78c, etc., engaging and corresponding in number to the storage pins 70A to 77A. The knife bar may be mounted on a pair of pivoted arms such as 142 interconnected by an armature 84A operatively associated with an electromagnet 115A. The push buttons 10A to 17A are arranged in a series with the cam operated switches 90A to 97A, inclusive. The electromagnet 115A is arranged in series with the push buttons 10A to 17A and the cam operated switches 90A to 97A, so that the knife bar may be actuated by the electromagnet 115A whenever a push button and the corresponding cam operated switch are simultaneously in closed position.

Assuming that the push button 12A has been actuated, a circuit will be completed through switch contacts 96A to immediately energize the motor 89 to drive the cam 79A. As the projection 80b actuates the switch 96A to engage contact 96B, a circuit will be completed to the electromagnet 115A. The energization of the electromagnet momentarily actuates the armature 84A, thereby moving the knife bar toward the cam 79A. This positions the knives within striking engagement by the projections 80a—b—c etc. While the knives are momentarily in this position, one of the projections is adapted to engage one of the knives to depress a storage pin.

Figure 12A:
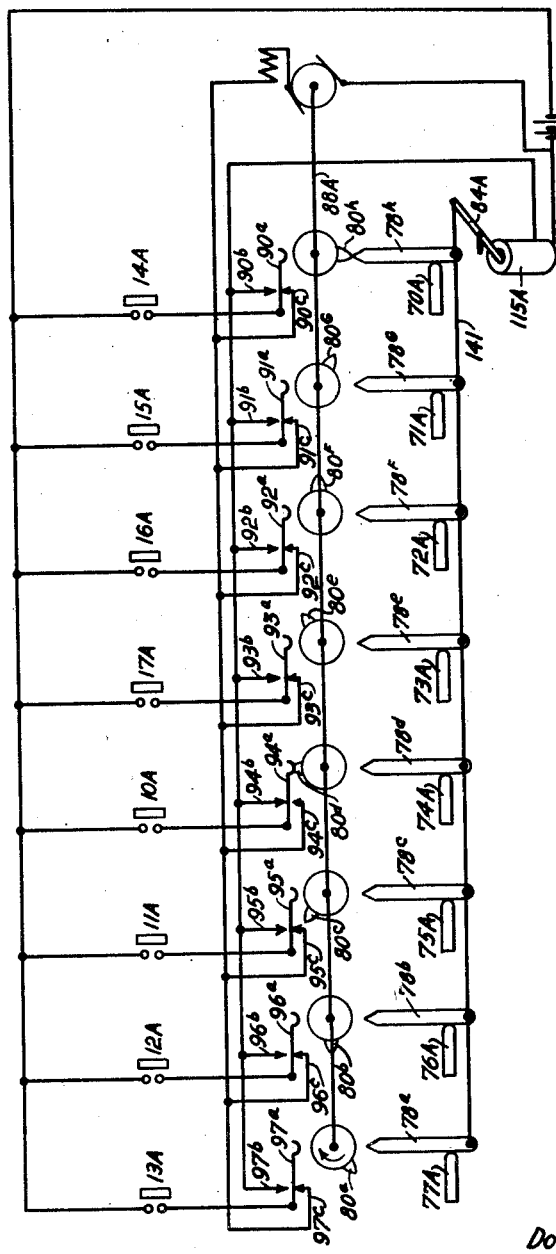
Figure 12a is a schematic illustration of the mechanism of Figure 12 showing the sequential operation of the various parts.

The sequential operation of the various switches 90A to 97A, the connection of the pushbuttons 10A to 17A to the switches, the operation of the projections 80a, 80b, etc. for actuating the switches, the knives 78a, 78b, etc. and the storage pins 70A to 77A, is readily apparent from the schematic illustration in Figure 12a.

It will be apparent from this arrangement that the cam does the work of moving the storage pin rather than the magnet, the magnet merely pushing all knives into a position where the corresponding cam will strike a knife and push a pin.

For large installations, the knife arrangement of Fig. 12 may involve too great a mass for sensitive operation by a single electromagnet. I have therefore shown in Fig. 13 an additional form which the call registering mechanism may take. In this additional form individual knives or swords may be provided for each of a large number of push buttons, with a light weight guiding means common to all which is sensitive to the operation of a single electromagnet.

For purposes of brevity only two storage pins are illustrated with their associated elements, but the number used in practice will, of course, correspond to the number of floors. Each sword, such as the sword 143, is pivotally supported by an independent lever 144 pivotally mounted as at 145 and biased for engagement with the cam 79B by a spring 146. The sword 143 is provided with a cross piece 147 at one end and a pointed portion 143A at the other end. Associated with the sword is a pivotally supported lightweight guiding bracket 148 comprising parallel spaced bars 148A and 148B against which the cross piece 147 is adapted to be moved during cam actuating movements. An electromagnet 115B is arranged to pivot the bracket 148 clockwise when the magnet is energized. A series of storage pins such as the pin 77B are arranged adjacent the cam 79B but normally out of engagement therewith. Located adjacent and below the storage pins is a V-shaped abutment 161 which is adapted to cooperate with the swords in lifting the proper pins into striking relation of the cam. A series of switches such as the switch 162 are arranged for operation by the levers 144. The switch 162 normally engages a contact 162A to complete with the push button 17B a circuit for the motor 89, (Fig. 6), and when actuated to engage the contact 162B, to complete a circuit to the electromagnet 115B.

Assuming that the push button 17B has been actuated, and that the lever 144 is not engaged with the cam 81a, the motor 89 will be energized to immediately rotate the cam 79B. As the projection 81a engages the lever 144 a circuit will be completed by the switch contacts 162, 162B to energize the electromagnet 115B. The bracket 148 is normally positioned so that the bar 148A will engage the upper portion of the cross piece of each sword, thereby tilting the swords downwardly as the supporting levers are rocked to the right by the cam 81a. When the electromagnet 115B is energized, the bracket 148 is rocked clockwise so that the portion 147B of the cross-piece 147 will engage the lower bar 148B. This rocks the sword slightly clockwise so that as the lever 144 is disengaged by the cam projection, the pointed end 143A is adapted to engage the upper surface of the V-shaped member 161. The action of the spring 146 on the lever 144 causes the sword to slide beneath and lift the storage pin 77B adjacent the cam 81a so that the cam projection 81a may actuate the storage pin 77B by moving it longitudinally. The storage pins are supported for limited vertical movement as the result of the movement of the pointed end of the sword 143A under the storage pin, as well as for longitudinal movement by the cam 81a to move the storage pin to active position.

Figure 13:
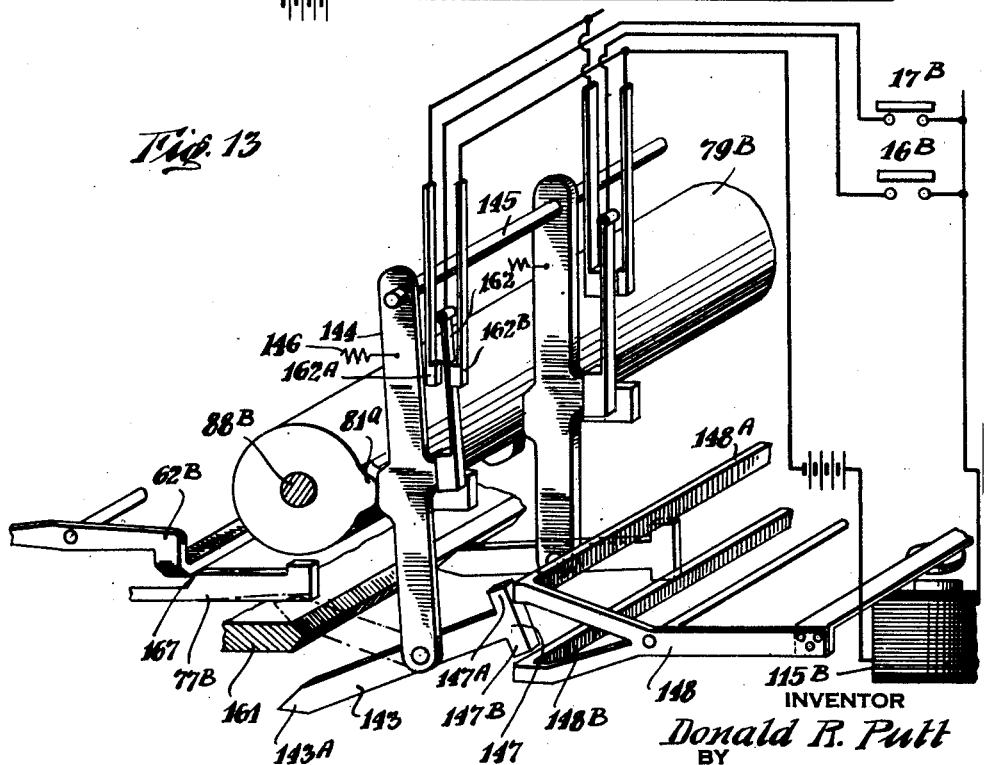
Figure 13 is a schematic illustration of a further form of call registering mechanism.

The storage pins may each be shaped to provide a cam surface 161, as shown in Fig. 13, for operating one or more switch levers 62B. As a storage pin is actuated by a cam projection and forced lengthwise beneath a switch lever, the lever will be rocked by the cam surface 167 and caused to operate the switch associated therewith.

Besides a mechanically operated code signal generating mechanism, as illustrated in Figs. 1 to 5, my invention may include a code signal generating means magnetically operable to provide combinations of electrical impulses or closed circuits to represent the different positions of the car as the car moves up and down the hatch. A form of magnetic code signal generating means is illustrated in Fig. 14. The hatchway is provided with three rows of U-shaped permanent magnets with the polarity thereof arranged in an order similar to the same shown in Figure 1. The car is provided with polarized switch levers 230, 231 and 232, which are magnetically operable between left and right hand positions to open and close different circuits or combination of circuits as the levers are brought adjacent the permanent magnets.

Assuming that the car is at rest at the first floor and the free ends of the switch levers 230, 231 and 232 are south poles, the levers will each be in a left-hand position with the contacts open. As the car approaches or arrives at floor 2F, the south pole of the magnet 213 will repel, and the north pole of the magnet 213 will attract, the free end of the switch lever 230, causing the lever to move toward the north pole and thereby close the contacts 230A—B. The lever 230 will remain in this position until the car arrives at floor 3F, where it will be magnetically actuated from the right position to a left hand position by the polarity of magnet 215. The lever 231 will also be magnetically actuated at floor 3F from a left hand position to a right hand position by the magnet 214. Thus, at floor 3F the contacts 230A—B are opened and the contacts 231A—B are closed. At floor 4F the polarity of the magnet 217 being the same as magnet 214 will cause the lever 231 to remain in a right-hand position. The polarity of magnet 218 being opposite to the magnet 215 will magnetically actuate the lever 230 from the left-hand position to the right-hand position, thereby closing contacts 230A—B. Therefore, for the car position at floor 4F, the circuits 225 and 226 are both closed. The magnetically operated switches will thus be operated as the car moves up and down the hatch to provide different combinations of electrical currents or impulses over the three circuits 225, 226 and 227 for the different floors.

The electrical impulses provided over the three circuits may be transmitted to points remote from the car to indicate the position of the car as it moves up and down the hatch. A construction of a decoding device for receiving the code signals for conversion into mechanical indexing movement is illustrated in Fig. 15. The decoding device comprises a series of electromagnets 219, 220 and 221, which are so interconnected as to convert the different combinations of electrical impulses into a resulting mechanical movement on a bar 222. The electromagnet 219 is fixedly mounted in a guide 223 in which the electromagnets 220 and 221 are slidably supported. The armature 219B is pivotally connected to the frame member 219C of the magnet 219 and normally retracted by the action of a spring 224, a distance in the order of one unit from the pole piece 219A. The center portion of the armature 219B is pivotally connected to the frame member 220C of the magnet 220. The member 220C in turn pivotally supports the armature 220B, which is normally retracted by the spring 224 a distance in the order of two units from the pole piece 220A. The armature 220B is pivotally connected to the frame 221C of the magnet 221, which pivotally supports the armature 221B, normally retracted by the spring 224 a distance equivalent to four units from the pole piece 221A. The armature 221B is pivotally connected to the bar 222, which is adapted to receive the summation of the actions of electromagnets 219, 220 and 221 through the interconnections described.

Assuming that the decoding device of Fig. 15 is operatively connected to the corresponding circuits of the code signal generating arrangement such as illustrated in Fig. 14, the decoding operation of signals would be as follows:

Assuming that the car is at floor 2F with the switch contacts 230A—B closed, the electromagnet 219 would be energized to attract the armature 219B and thereby move the bar 222 from an indexing position corresponding to floor 1F to an indexing position corresponding to floor 2F. Since switch contacts 231A—B are closed and contacts 230A—B are opened at floor 3F, the electromagnet 220 only would be energized thereby moving the bar 222 to the indexing position corresponding to floor 3F. Since the switch contacts 230A—B and 231A—B are both closed when the car reaches floor 4F, the electromagnets 219 and 220 are both energized, thereby moving the bar 222 in accordance with the summation of armature movements of both electromagnets, causing the bar 222 to assume an indexing position corresponding to floor 4F.

From the foregoing description, it will be apparent that the series arrangement of electromagnets operate to move the bar 222 an amount corresponding to the different combinations of electrical impulses received over the circuits 225, 226 and 227. The indexing movement of the bar 222 may thus be used in the place of the mechanically actuated link mechanism illustrated in connection with the control means of Fig. 6. By using the magnetic decoding device, the control means of Fig. 6 may be located at a distance remote from the car being controlled. The movement of the bar 222 may also be advantageously applied to switches for hall lanterns or other indicator mechanism for indicating to observers the position of the car in the hatch. This code and decoding system also materially reduces the number of circuit conections heretofore required between the car and the control means and car position indicators for elevator systems for the same number of floors.

Other embodiments will be apparent to one skilled in the art uitilzing the impulses from the three circuits to operate three electromagnets so as to effect a resulting movement and positioning of a control or index member in accordance with the movements of the car. One such form is illustrated in Fig. 15a. In this embodiment three electromagnets 2190, 2200 and 2210 are provided with armatures 219D, 220D and 221D which move unit lengths of 1, 2 and 4, respectively. Attached to the armatures moving 1 and 2 lengths are racks 221E and 221 F arranged for parallel movement. The racks are provided with teeth on their inner face and engaged with the teeth is a pinion 221G. A similar pair of racks is provided, one 221H of which is operated by the magnet moving four lengths and the other 221J of which is connected to the index or movable element 221K of the control means. Between the second pair of racks is also a pinion 221M, and the two pinions are interconnected by the member 221N. Movement of any one of the racks by the corresponding electromagnet will cause a rotation of the pinion engaged to the moved rack and will effect movement of the index rack. Because of the arrangement described, the movement of the control will depend upon the actuation of the electromagnets, for example, movement of the first an third electromagnets moving one and four of the units respectively will move the control rack five units.

It will be obvious that various mechanical and electric means may be developed to decode the code comprising the signals indicating the position of the elevator, and the four means here disclosed are to be understood as illustrative embodiments.

Referring to Figs. 16 and 17, another form of magnetic code signal generating means is shown. This form comprises an arrangement of non-magnetized steel pieces such as 172 and 173 at spaced points along the hatch in proper relation with respect to the floor levels. For an eight floor installation, there will be three rows of steel pieces arranged in an order similar to the north and south poles of the permanent magnets of Figure 14. The steel pieces of the series associated with the cam follower 39 are vertically spaced in alternate right and left hand positions, as indicated in Figs. 16 and 17. The elevator car is provided with a horseshoe magnet 178, the polarization of which may be permanent, or if desired, controlled by a D. C. circuit. Vertically spaced with respect to the electrically controlled magnet 178 is a polarized magnetic switch 179 having contacts 179A—B.

During movement of the car the steel pieces are magnetized by the magnet 178 along the edges thereof adjacent the car with a polarity opposite to that of the poles 178S or 178N whichever is in alignment with that particular steel piece. Assuming that the car is moving in an upward direction, the leg 178S having a south polarity will, as indicated in Figs. 16 and 17, magnetize the steel piece 172 with north polarity. The switch 179 which is vertically spaced below the magnet 178 will be attracted by the polarity of the steel piece 172 to attract the switch lever 179 to the left, as viewed in Fig. 16, thereby opening the contacts 179A—B. Thus, the steel pieces are properly magnetized by the electrically magnetized magnet 178 to insure the maintenance of the magnetism of the steel pieces for code signal generating purposes. The electrical impulses provided by this form of code signal generating means may be used to actuate the decoding device of Fig. 15.

Figure 18C:
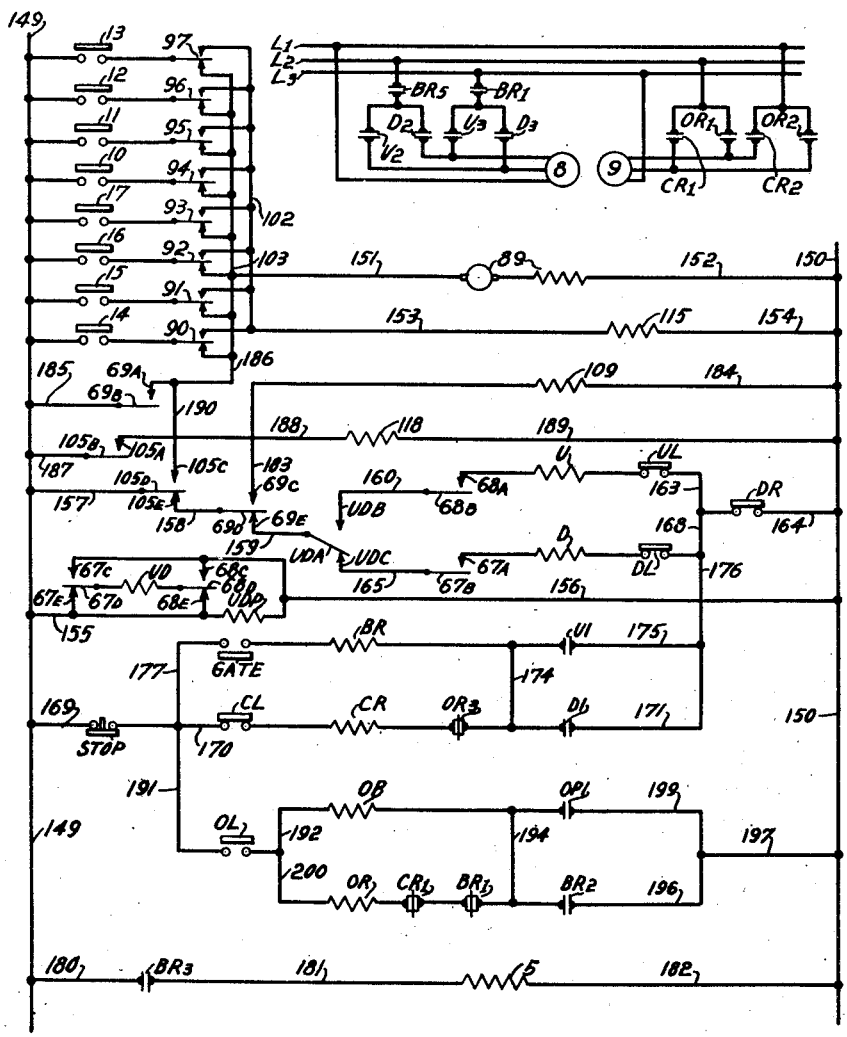
Fig. 18c is a schematic wiring diagram of the mechanism illustrated in Figs. 18a and 18b.

An additional code signal generating arrangement is illustrated in Fig. 18. The elevator car is provided with an E-shaped magnet 203, the polarization of which may be permanent or controlled by a magnetizing coil 204 wound about the center leg 203B. The coil 204 is permanently energized by a source of direct current so that the center leg 203B is given a north polarity while the two end legs 203A and 203C are given a south polarity. The hatch is provided with steel pieces 205 and 206 vertically spaced in alternate left and right-hand positions similar to the arrangement of the steel pieces 172 and 173. The adjacent steel pieces are spaced vertically in the shaft, one of a series of steel pieces being provided per floor. The opposite sides of the E-shaped magnet 203 are provided with coils 207 and 208 connected in series with each other and a relay 209.

As indicated, the alternate steel pieces 205 and 206 are arranged to bridge certain of the legs of the magnet 203 as the car moves up and down the hatch. The steel piece 205 is adapted to bridge the legs 203A—B while the steel piece 206 is adapted to bridge the gap between the legs 203B—C. The bridging of either gap between the legs of the magnet 203 provides a metallic inductive path which has the effect of increasing the flow of flux through the legs which are bridged. Any increase or decrease of flux flowing through the legs of the magnet 203 cuts the turns of the coil 207 or 208, as the case may be, to produce a flow of current in the relay 209. Should the steel piece 205 bridge the gap between poles 203A and 203B a current will be generated in the coil 207 by the increased flux. Should the steel piece 206 bridge the legs 203B—C, a current will be generated in the coil 208 in a direction reverse to that generated in coil 207 by the change of flux in the legs 203A—B. Electrical impulses flowing in opposite directions in the relay 209 may be generated as the two gaps of the magnet 203 are alternately bridged. As the current is generated in the relay 209 in first one direction and then the other, the relay operates to open and close a circuit through its armature in a manner similar to the opening and closing of the circuit 225—228 as explained in connection with Figure 16. By providing additional series of steel pieces and E-shaped magnets in the manner of Figure 14, electrical impulses may be generated as a code to operate the control means or a car position indicator or both. If desired, rectifiers may be inserted in the circuit with relay 209 and by suitable switching means in the rectifier circuits it will be possible to ascertain whether the signal is being generated as the car enters or leaves the floor zone.

In Figure 18a there is described another complete and illustrative complete embodiment of the invention. This utilizes the analyzing means of Figure 6 and the common means for setting up the storage elements that is described more particularly in Figures 12 and 12a. The means for forming the code is illustrated more particularly in Figure 14 and the decoding means is illustrated in Figure 15. The indicator 19 in the car is described more particularly in Figures 27 and 28. The reference numerals in Figure 18a are the same as those employed in designating the same parts in the description heretofore and this description will not be repeated.

Figure 18b is a wiring diagram which describes the operation of the complete embodiment shown in Figure 18a.

Referring to Figure 19, a system is illustrated for generating code impulses to represent the car position in conjunction with appropriate switch connections for indicating the car position by means of lamps, either located in the car, at the first floor, or wherever else desired. Three car position levers 233, 234 and 235 with rollers 233A, 234A and 235A, respectively, are provided similarly as in the system illustrated in Figure 1. The levers are also provided with cams 233B, 234B and 235B, respectively, for actuating the associated switches 236, 237 and 238 from left to right hand positions corresponding to the positions of the levers. The different contacts of the three switches are so interconnected with the lamps 1 to 8 as to provide a closed circuit for each lamp corresponding with the position of the car and the resulting combination position assumed by the levers 233, 234 and 235.

The position illustrated in Figure 19 represents the car as being at the first floor. The circuit for the lamp No. 1 extends between the leads 239 and 263 through wire 240, contacts 238B—A, wire 241, contacts 236H—G, wire 242, contacts 237E—D, wire 243 and the lamp No. 1. As the elevator moves up the shaft to the second floor the lever 233, as previously described, is forced from the left-hand position to a right-hand position, thereby actuating switch 236. This combination of lever positions provides a circuit to lamp No. 2 through contacts 238A—B, 237G—H, and 236H—J.

As indicated in Table No. 2 herebelow, the switches 236, 237 and 238 provide different combinations of circuits for the different combinations of positions assumed by the levers 233, 234 and 235 at the several floors. Thus the lamps representing the eight floors will be energized to represent the position of the car in accordance with the positions assumed by the levers 233, 234 and 235. The switch contacts which are closed for the different combinations of positions are indicated in the table.

*Table No. 2*

| Lamp Energized | cam lever positions | | | switches closed | | |
|---|---|---|---|---|---|---|
| | 235 | 234 | 233 | 238 | 237 | 236 |
| 1 | Left | L | L | A-B | D-E | G-H |
| 2 | do | L | R | A-B | G-H | H-J |
| 3 | do | R | L | A-B | E-F | G-H |
| 4 | do | R | R | A-B | H-J | H-J |
| 5 | Right | L | L | B-C | K-L | A-B |
| 6 | do | L | R | B-C | K-L | B-C |
| 7 | do | R | L | B-C | L-M | D-E |
| 8 | do | R | R | B-C | L-M | E-F |

The switches 236, 237 and 238 of Figure 19 are also provided with additional contacts for generating a code of electrical impulses in accordance with the combination positions assumed by the levers. The switch 236 is provided with switch contacts 236L and 236M for the circuit wire 262; switch 237 is provided with switch contacts 237B and 237C for the circuit wire 260, and the switch 238 is provided with switch contacts 238E and 238F for the circuit wire 257. Since these switch contacts are closed and opened in accordance with the position of the levers 233, 234 and 235, a different combination of impulses will be delivered over the three circuits corresponding to the positions assumed by the three levers. The different combinations are indicated in Table No. 2.

The generated code of electrical impulses over the circuits 257, 260 and 262 may be transmitted to any location desired for the purpose of actuating any decoding device, for example, such as illustrated in Figure 15, which may be associated with a control means such as shown in Figures 6 to 8. The electrical impulses may also be used to control an electromagnetically operated link mechanism, such as illustrated in Figures 15a, 27 and 35.

Referring to Figures 20, 21 and 22, a switch arrangement may be provided for controlling the energization of the indicator lamps Nos. 1 to 8, by associating the switches corresponding in number to the number of lamps with an indexing member 54A', such as bar 54 of the control means of Figure 6, or the indexing bar 222 of Figure 15. Assuming that the switches 265 to 272 are connected by individual circuits to the lamps Nos. 1 to 8, respectively, the closing of one of the switches by the movement of a cam 264 carried by the indexing bar 54A will operate to close a circuit for the particular lamp which corresponds with that particular indexing position of the bar 54A'.

Referring to Figure 23, a further form of car position indicating means of the magnetic bridge type is disclosed, for operation with the levers 233, 234 and 235 of Figure 19. The magnetic indicator comprises a pair of operating magnets 295 and 296 disposed substantially at right angles to each other and wound so that the pole pieces 295A and 296A are of like polarity. Disposed at approximately the intersection of the center lines of the two magnets is a permanent magnet 297 which carries a pointer 298. The pointer 298 is associated with a numeral dial plate 299 representing the floors serviced by the elevator car. The pole piece 296A is provided with an extension 296B to a position adjacent the dial plate to provide a further attraction for the permanent magnet 297 by the electromagnet 296, thereby overbalancing the effect of the magnet 295 when the elevator car is at certain floors.

The permanent magnet of the pointer 298 is thus attracted by the two electromagnets causing the pointer to assume a position between the poles of the two magnets where the strength of the magnetic flux is evenly balanced. The ratio of the flux density provided by the pole pieces 295A and 296B is varied by actuation of the contacts 273—4, 275—6 and 277—8, which operate in different combinations, depending on the floor reached by the elevator car to shunt various amounts of resistance across the electromagnet 296. The resistances 279, 280 and 281 are so proportioned that when the switch contacts 273—4 are closed, the current flowing in the electro-magnet 295 is increased and the current in the electromagnet 296 is decreased in such amount that the flux of the two magnets are changed say one-eighth from the total. When the switch contacts 275—6 are closed, the others being open, the currents in the electromagnets 295 and 296 are so changed as to alter the flux one-quarter of the total and when switch contacts 277—8 are closed, the others being open, the currents in the electromagnets 295 and 296 are so changed as to alter the flux one-half of the total. As different combinations of positions are assumed by the levers 233, 234 and 235, the current flowing in the electromagnets 295 and 296 are proportionally altered to effect a reading on the dial corresponding to the car position. The circuit for electromagnet 295 extends from the line 282 through wire 284, the winding of electromagnet 295 and the wire 285 common to both electromagnets. The circuit for electromagnet 296 extends from line 283 through wire 292, the winding of electromagnet 296 and the common wire 285.

Thus for the elevator car position at floor 1F, the pointer will assume the position indicated since the stronger magnet 296 is not shunted by any resistances at the left-hand positioning of the levers 233, 234 and 235. With the car at floor 2F and the lever 233 in a right-hand position with the contacts 273—4 closed, a circuit will be provided through wires 287, contacts 273—4, wire 286, resistance 281 and wire 285 shunting the electromagnet 296. The magnet 296 is thus weakened and the magnet 295 strengthened sufficiently to cause the magnet 297 to be attracted with slightly greater force toward the magnet 295, moving the pointer 298 to indicate that a car is at the second floor. The resistances 281, 280 and 279 are shunted across the electromagnet 296 in order of the combination positions assumed by cam followers 233, 234 and 235, which are indicated in Table No. 2. Should it be desired to provide additional car position indicators, the wires 289, 290 and 291 are provided for transmitting the appropriate current values provided by the switches and resistances illustrated in Figure 23.

Referring to Figures 24, 25 and 26, I have shown a form of push button code signal generating means. This form is particularly desirable in certain installations in elevator cars for the purpose of sending stop call signals to remotely located controls. The car buttons 301 to 308 are reciprocatably mounted in guides 309 and 310, each button being biased to retracted position by an individual spring, such as 317. Associated with the buttons are three code bars 311, 312 and 313 and an operating bar 314. The code bars are provided with a plurality of notches, some of which are rectangular and others with beveled sides for cooperation with the ends of the push buttons. For example, when the push button 301 is actuated, the end of the button will enter the rectangular notches 311A, 312A and 313A, without changing the positions of the bars 311, 312 and 313. Upon entrance of the end of the button 301 into the notch 314A it engages the beveled edge 314B to force the bar to the right closing the switch 321—2, indicating that the push button 301 has been actuated. The actuation of push button 302 likewise operates, as indicated by the notches in Figures 25 and 26, that the bars 311 and 314 are actuated to provide two closed circuits representing that the push button 302 has been actuated. The examination of the remaining notches of the bars 311 to 314 will indicate that a different combination of code bar movements will be produced by the actuation of each car button. It is also to be noted that while one car button is actuated, the bars locked by the engagement of rectangular notches will be prevented from being moved by other buttons. Thus only one button at a time can be actuated, thereby avoiding the possibility of false signals. The switches 319—20, 317—18, 315—16 and 321—22 can be used to generate a code for any of the purposes described herein.

In Figures 27 and 28 I have illustrated a shutter type of indicator which is operable in response to a code of electrical impulses, such as provided by the code signals transmitted over the circuit wires 225, 226 and 227 of the code signal generating mechanism illustrated in Figure 14 or circuit wires 257, 260 and 262 of Figure 19. The three shutter leaves 323, 324 and 325 are associated with relays 328, 329 and 330, respectively, which respond to combinations of electrical impulses corresponding to car positions to selectively actuate the shutter leaves. Referring to relay 328, each relay being similarly constructed is provided with an armature 328A pivotally connected to its respective shutter leaf 323 by a connecting rod 328B. The shutter leaves are provided with apertures spaced in a predetermined order, so that light from a lamp 327 may pass through the three leaves to illuminate a selected index number of a transparent or translucent numeral strip 326. Each of the leaves are biased by a spring such as 328C to assume a right-hand position so that when any of the relays 328, 329 and 330 are deenergized, the corresponding leaf will be retracted to normal position. When the car proceeds to the second floor and the lever 230 of Figure 14 or lever 233 of Figure 23 is moved to right-hand position, sending an electrical impulse to relay 330, the leaf 325 will be moved to the left, shutting off the light to the index No. 1 and permitting light to illuminate index No. 2. As the car proceeds upward in the hatch the electromagnets will be energized in accordance with the combination positions answered by the car position leaves to illuminate the corresponding index numbers.

Referring to Figures 29 to 33, the code signal generating and decoding system of the invention is shown applied to large installations constituting, as in the case of a large elevator installation, a large number of floors to be serviced. For example, the code signal generating and decoding system may be provided to service a large number of floors with a minimum number of wires between the car and the control means and/or car position indicator. For 64 floors the number of wires necessary with my invention would be 7, to service 127 floors the number of wires necessary woould be 8, and for 256 floors only 9 wires, whereas in the usual installations the number of wires required would be 65, 129 and 257, respectively.

The decoding mechanism of the invention may, for a large number of floors, be constructed in miniature proportions. As illustrated in Figure 29, sections of two link mechanisms similar to that illustrated in Figures 3 to 6, may be arranged to control the consecutive actuation of as many as 64 switches. These switches may be utilized in connection with means for controlling the movement of the elevator car or for operating a car position indicator. The resulting movements of the link mechanisms may also be arranged to operate a shutter arrangement of miniature proportions for indicating car positions, as shown in Figure 31. The car may also be provided with a panel of push buttons of the "stick" type which are automatically released by the decoding device or car position indicator as the car button calls are answered by the elevator car.

Referring particularly to Figure 29, the group of switch contacts 35A represents six car position levers 478—483, the levers operating as movable contacts to open and close electrical circuits including stationary contacts 478A—483A, respectively. By properly arranging the lever actuating cams, steel pieces or magnets, as the case may be, a different combination of electrical impulses are generated for each of the 64 floors. The decoding mechanism comprises two sections 35B and 35C. The decoding mechanisms may be of one of the forms shown in Figures 15 and 15a, or of a variation of one of those forms. The decoding mechanism 460 of the section 35B is a variation of the magnetic-link type and comprises a series of six links anchored at one end to a guide member 449 by a pin 460A and pivotally connected at the other end to an actuating bar 446. Alternate joints interconnecting the links are associated with armatures 443A, 444A and 445A of the electromagnets 443, 444 and 445 which are adapted to compress the links when the electromagnets are energized. The actuating arm 446 is provided with a cam 447 adapted to actuate a series of contact bars 451 to 458 as the bar 446 is reciprocated back and forth during the operation of the link mechanism 460. Each of the contact bars is reciprocably mounted in a frame 459 and resiliently held in engagement with the bar 446, by a spring such as 451A. The actuating bar 446 is provided with a spring 448 to bias the link mechanism 460 against the armatures 443A, 444A and 445A.

The link mechanism 473 of the decoding section 35C is similarly arranged in coactive relation with electromagnets 469, 470 and 471, to operate an actuating bar 474 arranged at right angles to the actuating bar 446 and retractively biased by a spring 476. The bar 474 is provided with a cam 475 adapted to actuate a series of contact bars 461 to 468 which are arranged at right angles to the contact bars 451 to 458. Each of the bars 461 to 468 is provided with a spring such as 468A to bias the bars in operative relation against the actuating bar 474.

The linkage of the decoding sections 35B and 35C are so arranged with respect to the electromagnets that the actuating bars 446 and 474 are moved a distance equal to the space between adjacent contact bars when the electromagnets 443 and 469 are energized. The armatures of electromagnets 444 and 470 are so proportioned as to move the actuating bars a distance equal to two spaces and the armatures of electromagnets 445 and 471 are proportioned to effect a movement of the actuating bars a distance equal to four spaces.

Referring to the contact bar arrangement 35D, each bar is provided with a series of contacts which are insulated with respect to the bar and arranged to engage a corresponding contact of the bars engaged at right angles thereto. In the bank of contacts, the corresponding contacts are indicated as .1 to .64 representing floors 1 to 64.

The code signal generating device 35A is so electrically connected to the decoding section 35C as to effect a movement of the actuating bar 474 to a different position for each bank of eight floors, while the connections to the decoding section 35B are such as to effect a movement of the actuating bar 446 to a different position for each of the floors of the bank of eight floors. For example, the bar 474 is shown to be in the position assumed for the first bank of eight floors depressing the contact bar 461. The bar 446 is shown in the position it assumes at the first floor depressing the bar 451 to close the contacts .1 which corresponds to the first floor.

As the car moves upward to the second floor, the lever 483 will be moved to close with the contact 483A to energize the magnet 443 and depress the link mechanism 460 in the order of one space or unit to move the cam 447 from beneath the bar 451 to a position beneath the bar 452. The contacts .1 are thereby disengaged and the contacts .2 brought into engagement, the latter corresponding to the second floor. As the car continues upward, the bars 453 to 458 will be depressed in serial order until the ninth floor has been reached. At the ninth floor, the bar 446 will remain in the same position assumed for the eighth floor, and the electromagnet 469 of the section 35C will be energized by operation of the lever 478. The closing of the circuit to the electromagnet 469 causes the actuating bar 474 to be moved a distance of one space to release the contact bar 461 and depress the contact bar 462. The bars 458 and 462 being depressed as the car arrives at the ninth floor will close the contacts .9. The operation of the actuating bar 446 is now reversed and for the next bank of eight floors the bar 446 will be retracted in the order of one space for each floor, thereby closing the contacts corresponding to each floor at which the car arrives. From the foregoing it will be apparent that the system illustrated in Figure 29 will operate 64 switch contacts in accordance with the car position as the car arrives or passes 64 floors.

If a greater number of floors are to be serviced, the system may be increased by merely adding a lever to the group 35A. Should 128 positions be desired, one additional electromagnet and wire would be necessary, together with the corresponding additional contact bars actuatable by the additional electromagnet. The additional electromagnet would, of course, be arranged to move the actuating bar in the order of eight spaces, thus materially increasing the extent of the movement of the actuating bar. Likewise, if another car position lever, electromagnet and necessary links be added to section 35C, as many as 256 different positions or conditions could be serviced, and so on.

The operation of the actuating bars 446 and 474 may also be used to operate a car position or condition indicator of the shutter type. In Figures 30 and 32, a translucent or transparent numeral plate 511 is provided with 64 index positions. Mounted for reciprocation at right angles and in overlapping relation are two sets of shutters 495 to 502 and 503 to 510, respectively, which correspond exactly with the contact bars of Figure 29. The actuating bars 446 and 474 are provided with rollers 493 and 494, respectively, for actuating the shutter leaves in a consecutive order as described in connection with the contact bars. Each shutter leaf is provided with a series of openings, one corresponding to an opening in one of the other set of leaves. With the car at the first floor, the actuating bars 446 and 474 will assume the position indicated in Figure 31, thereby actuating leaves 495 and 503, causing the corresponding openings to coincide, permitting light from the lamp 512 (Figure 32) to pass through the shutters to illuminate numeral 1 of the numeral plate 511. As the car moves up and down the hatch, the actuating bars 446 and 474 will be moved as previously described to actuate the shutter leaves to illuminate the numerals of the numeral plate 511 which correspond with the floor at which the car has stopped or is passing at the moment.

Referring to Figure 33, an arrangement of car buttons of the magnetic "stick" type is illustrated which are adaptable for compact panel arrangement for coaction with the actuating arms 446 and 474 to automatically release the buttons as the car answers the calls initiated thereby. The magnetic "stick" buttons are indicated as 1CB, 2CB, 63CB and 64CB, corresponding to the floor which they represent. The magnets for holding the push buttons until answered are indicated as 1CH, 2CH, 63CH and 64CH. Each push button 1CB to 64CB is connected in series with the contacts .1 to .64, respectively, and all in series with a stop relay 518 which operates through appropriate control circuits to stop and hold the car at the floor corresponding to the circuit completed. A switch 521 may also be provided to release the car buttons at the end of a trip or whenever else desired.

Since the car buttons all operate on the same principle, only one will be described. When the car button 16CB, for example, is pressed, a circuit is completed from the lead 484 over wire 515, push button 16CB, magnet 16CH, wire 520, to the lead 485. This circuit energizes the magnet 16CH to hold the push button 16CB closed. When the combination of car position levers corresponds to the sixteenth floor, the actuating bars 446 and 474 will operate to close the contacts .16 (Figures 29 and 33), thereby completing a circuit from the push button 16CB through contacts .16, wire 517 and relay 518 to the line 485. The relay 518 being energized operates in conjunction with other control means to stop the car at the floor desired. Thus the push button 16CB having been pressed and held closed by the magnet 16CH, will cause the car to be stopped when the contacts .16 are closed.

In some instances, it may be desirable to simplify the shutter type of indicator illustrated in Figures 30–32. This is accomplished by providing two overlapping plates 523 and 524, as shown in Figures 34 and 35. These plates are each provided with a slot 525 and 526, respectively, which are adapted to intersect at different combination positions along the length of the slots which correspond with the car positions indicated on the numeral plate 511A (see Figure 30). The plates are arranged for reciprocation between the bearings 527, 528, 529 and 530. The plate 523 is adapted to be operatively connected at 523A to the actuating bar 446, while the plate 524 may be connected at 524A to the actuating bar 474. As the various signals representing the car position are received by the magnetically actuated link mechanism (Figure 29), the aperture plates 523 and 524 are moved in the same manner as the bars 446 and 474 to assume 64 different combination positions. For each different position of the plates the slots 525 and 526 will intersect at a different relative position along the length of the two slots, allowing light to pass for the purpose of illuminating the numeral on the numeral plate 511A which corresponds to that position of the car.

Referring to Figures 36 and 37, a mechanism is provided for scanning and resetting a series of mechanical "stick" car buttons. As indicated in Figure 37, a bank of car buttons, such as 542 and 543, is provided. When the car buttons are pressed they are each held by an individual spring biased detent such as 543A. A pair of slotted plates 523A and 524A, similar to the plates of the indicator device illustrated in Figs. 34 and 35, are provided for reciprocation between the bearings 527A—530A. The plate 523A is provided with a switch 537 having contacts 537A and 537B. Mounted on the plate 523A adjacent the switch 537 is a rider 539 which extends through the slots 525A and 526A for movement therealong in response to the movement of the plates. The rider 539 contains a central pin 538 biased by a spring 540 for sliding movement against a push button panel 545. Mounted in brackets 535 and 536 between the slot 525A and the switch 537, is a pin 534 disposed parallel to the slot 525A. Pivotally supported on the pin 534 is a bracket 533 which is slidably engaged by the pin 538 for all positions of the rider along the slot 525A. The bracket is provided with an extension 533A which, when operated, will close the switch contacts 537A—B. The bracket 533 has another extension 533B which operates as an armature for an electromagnet 541 which is also mounted on the plate 523A.

In operation of the mechanical "stick" push buttons, assuming that the push button 543 has been pressed and the car is moving in the direction of the floor represented by the button 543, the movement of the car will be transmitted to the plates 524A and 523A by the code signal generating system, as illustrated in Figure 29, thereby moving the rider 539 in a scanning operation back and forth across the push button panel 545. When the pin 538 engages the depressed push button 543, the push button being sufficiently held by the detent 543A causes the pin 538 to be actuated against the spring 540. This movement of the pin 538 actuates the bracket 533 to close the contacts of switch 537, thereby energizing the control means to stop the car. During operation of the control means in stopping the car, a circuit is completed energizing the electromagnet 541, which operates to attract the armature extension 533B, thereby forcing the pin 538 to return the push button 543 to normal position.

In Figures 38 and 39, I have illustrated a variation of the shutter type of indicator. A translucent or transparent numeral panel 557, similar to the panel 511 of Figure 30, is mounted on a movable plate 556. The plate 556 is associated with two guide members 544 and 546 which are adapted for connection with the actuating bars 446 and 474, respectively, of the decoding mechanism of Figure 29. The guide member 544, which is slidably supported in a bearing 547A, is provided with arms 544A and 544B which support guide rollers 552, 553 and 554, 555, two of which are located at the opposed sides of the plate 556, which are in alignment with the guide 544. The guide member 546, which is slidably supported in a bearing 547B, is provided with guide rollers 548, 549 and 550, 551 for engaging the two remaining sides of the plate 556. A stationary plate 558 is provided adjacent the back side of the plate 556 and provided with a small aperture 559 through which light passes from the lamp 560 to illuminate a space on the panel 557 containing one of the numerals representing a floor.

As the guide members 544 and 546 are moved in accordance with the code signals received by the decoding mechanism, the plate 556 will be shifted in directions at right angles to each other to move the panel 557 crosswise and up and down with relation to the aperture 559 to permit illumination of the numerals in the order according to the movement of the car. For example, the guide member 544 will move the plate 556 from left to right during the movement of the car from the first floor to the eight floor. At the ninth floor, the guide member 546 will move the plate at right angles to the movement of the member 544 after which the member 544 retracts the plate 556 during movement of the car past the bank of floors from the ninth to the sixteenth. This form of indicator materially reduces the number of movable parts, as compared with the form illustrated in Figure 31.

In the foregoing description various means have been disclosed for generating code signals indicative of the position of the car for transmission over a minimum number of wires to the control means or to various types of car position indicators. Means have also been disclosed for generating push button code signals for transmission over a minimum number of wires from either a car or a dispatcher. In all of these code signal generating means, the combination of impulses, whether mechanical or electrical, have been transmitted to the control means or indicators simultaneously as a unitary signal.

While I have shown and described several forms and variations of the invention, I am fully aware that many additional modifications are possible. For this reason, it should be understood that the forms of the invention herein illustrated and described are intended to be illustrative of the invention only and not as limting the scope of the appended claims.

I claim:

1. In a control system for a device moveable from one to another of a plurality of positions; storage elements in which to store requests for the movement of the device to certain of said positions; means for analyzing said storage elements to control the operation of the device, and means operating independently of the operation of said analyzing means and subsequently to the analyzing operation and operating in common with respect to all of said storage elements and relatively moveable into physical proximity of the storage elements for coaction therewith to cancel the requests stored therein after the device has reached the position requested.

2. In a control system for a device moveable from one to another of a plurality of positions; means for initiating impulses corresponding to requests, storage elements one corresponding to each of said positions in which requests may be stored for the movement of the device to said positions; and means to store requests in said elements for the movement of the device to the positions desired including means operating in response to said initiating impulses and common to all of said storage elements and adapted for relative movement with respect of all of said elements and into physical proximity thereto for coaction therewith.

3. In a control system for a device moveable from one to another of a plurality of positions; a storage element for each position in which to store requests for the movement of the device to the positions desired, a signal initiating circuit for each of said positions, means for contacting said signal initiating circuits sequentially and means common to all the storage elements mounted for relative movement with respect to the storage elements to store in the corresponding storage element the requests indicated by any initiated circuit when it is contacted.

4. In a control system for a device movable from one to another of a plurality of positions; a storage element corresponding to each position in which to store requests for the movement of the device to the positions desired, a signal initiating circuit for each of said positions, means for contacting said initiating circuits sequentially, and means for storing requests indicated by an initiated circuit when it is contacted, including means operable in common with respect to all of said storage elements and actuatable when any request is made in a signal initiating circuit to store the requests in the storage elements.

5. In a control system for a device moveable from one to another of a plurality of positions; means for initiating signals indicative of requests; a plurality of storage elements each of which corresponds to one of said positions; means for storing requests in said elements for the operation of the device to one or more of the positions desired including means automatically operative in response to initiating signals and common to all of said elements relatively moveable into physical proximity of the storage elements for coaction therewith, and means for cancelling the stored requests when the device has moved to the position desired including means also common to all of the storage elements and relatively moveable into proximity of the storage elements for coaction therewith.

6. In a control system for a device moveable from one to another of a plurality of positions; means for initiating impulses indicative of requests, a plurality of storage elements each comprising a member moveable between an active and an inactive position, means to store requests in said storage elements for the movement of the device to one or more of the positions desired comprising means common to all of said plurality of said storage elements mounted for relative movement with respect to all of the moveable members of the said plurality of storage elements and operating in response to the initiating impulses to move said moveable member from inactive to active position.

7. In a control system for a device moveable from one to another of a plurality of positions; a plurality of storage elements each comprising a member moveable between an active and an inactive position, means to store requests in said storage elements for the movement of the device to one or more of the positions desired, means common to all of said storage elements mounted for relative movement with respect to all of the moveable members of said plurality of storage elements to move said moveable means from active to inactive position to cancel the request in the storage elements when the device has moved to the desired position, and means responsive to the position of the device to provide the relative movement for said common means.

8. In a control system for a device moveable from one to another of a plurality of positions; a plurality of storage elements each comprising a member moveable between an active and an inactive position; means to store requests in said storage elements for the movement of the device to one or more of the positions desired comprising means common to all of said plurality of said storage elements mounted for relative movement with respect to all of the moveable members of the said plurality of storage elements to move said moveable member from inactive to active position, and additional means to cancel the requests in the storage elements when the device has moved to the desired position comprising means common to all of said storage elements mounted for relative movement with respect to all of the moveable members of said plurality of storage elements to move said moveable means from active to inactive position.

9. In a control system for a device operable by a source of power from one to another of a plurality of positions; means for controlling the application of said power including storage means for registering requests for operation of the device to one or more of said positions, said storage means being provided with movable elements each corresponding to one of said positions, a plurality of movable members, one for each of said elements, separately mounted for movement relative to said movable elements and operable to move said elements, and means for selectively moving said members.

10. In a control system for a device operable from one to another of a plurality of positions; a plurality of elements changeable between an inactive and active position for storing requests for the movement of the device to positions desired, each of said elements corresponding to one of said positions, a plurality of circuits one for each of said positions, and magnetically operable means common to all of said elements and to all of said circuits operable in response to energization of any of said circuits to change the corresponding element from an inactive to an active position.

11. In a control system for a device operable from one to another of a plurality of positions; a plurality of elements changeable between an inactive and active position for storing requests for the movement of the device to positions desired, each of said elements corresponding to one of said positions, a plurality of circuits, one for each of said positions, and means operating in common with respect to all of said elements, including magnetic means operable in response to energization of any of said circuits to change the corresponding element from an inactive to an active position, and means common to all of said circuits to operate said common means in response to energization of any of said circuits.

12. In a control system for a device operable from one to another of a plurality of positions; storage means for registering requests representing positions desired, said storage means being provided with movable elements each representing one of said positions, means having a plurality of projections one for each of said elements, a corresponding number of circuits each having a switch to initiate the request and a second switch for actuation by one of said projections, means including a plurality of members movable to position for cooperation with said elements to enable said projections to effect actuation of said elements, said last-named means being operatively controlled by the actuation of a projection actuatable switch while the corresponding initiating switch is closed.

13. In a system of controlling a device movable from one to another of a plurality of positions; a plurality of storage elements corresponding to said positions, means for storing requests in said elements indicative of the positions to which the device is desired to be moved, means mounted contiguous to said storage elements and coacting with the storage elements themselves for constantly analyzing said storage elements, said analyzing means comprising a member movable upon coaction with an element in which a request is stored to establish an electrical circuit for causing the device to be moved in accordance with the requests stored.

14. In a system of controlling a device movable in either of two directions between a plurality of positions; a plurality of storage elements corresponding to said positions, means for storing requests in said elements indicative of the positions to which the device is desired to be moved, means contiguous to said storage elements and coacting with the storage elements themselves in which requests are stored for constantly analyzing said storage elements with respect to the existing position of the device, said analyzing means comprising a member movable upon coaction with an element in which a request is stored to establish an electrical circuit for causing the device to be moved in the direction of the position first requested.

15. In a system of controlling a device movable in either of two directions between a plurality of positions; a plurality of storage elements corresponding to said positions; means for storing requests in said elements indicative of the positions to which the device is desired to be moved, means contiguous to said storage elements and mounted for relative movement thereto and coacting with the storage elements themselves for constantly analyzing said storage elements with respect to the existing position of the device, said analyzing means comprising a member movable upon coaction with an element in which a request is stored to establish an electrical circuit for forming a plurality of zones one in each direction from the existing position of the device and separate means for each zone coacting with the storage elements themselves to cause the device to move in the direction of the position first requested.

16. In a control system for a device movable from one to another of a plurality of points; a plurality of storage means for storing requests representing points to which the device is requested to be moved, each storage means comprising a movable element, means for moving said element to an active position to store a request, means operable in accordance with the movements of the device and mechanically contacting said elements moved to active position, said last mentioned means comprising a member movable upon mechanical coaction with an element moved to an active position to control the movement of the device.

17. In a control system for a device movable in either of two directions from one to another of a plurality of points; a plurality of storage means for registering requests representing points to which the device is requested to be moved, each storage means comprising a movable element, means for moving said elements to an active position to store a request, means operable in accordance with the movements of the device and comprising a member mechanically contacting the elements moved to active position which correspond to points in one direction from the existing point of the device and a member mechanically contacting with elements moved to active position which correspond to points in the other direction from the existing point of the device, said mechanically contacting members being movable upon coaction with elements moved to an active position to effect the operation of the control.

18. In a control system for a device movable by a source of power from one to another of a plurality of positions; means for controlling the application of said power, storage means for registering requests representing positions to which the device is requested to be moved, said storage means comprising actuatable elements each representing one of said positions, means for actuating said elements to store requests, means operable in accordance with the operation of the device and mechanically coacting but electrically non-conducting with the actuated elements comprising a member movable upon said mechanical coaction with an actuated element to cause the device to proceed in the direction of the position represented by an actuated element, and means operable to discontinue the application of said power when the device reaches the position corresponding to said actuated element.

19. In a control system for a device movable from one to another of a plurality of positions; storage elements one corresponding to each of said positions in which requests may be stored for the movement of the device to said positions; means to store said requests in said elements, including means common to all of said storage elements and adapted for relative movement with respect to said elements and into physical proximity thereto for coaction therewith, means mounted contiguous to such storage elements and coacting with the storage elements themselves for analyzing said storage elements, said analyzing means comprising a member movable upon its coaction with a storage element in which a request is stored to cause the device to be moved in accordance with the request stored.

20. In a control system for a device movable from one to another of a plurality of positions; a storage means comprising a plurality of elements which are physically movable into an active position to indicate that a request is stored therein, means common to all of said elements and movable relative thereto to move an element into active position to store a request, means mounted contiguous to said elements and mechanically coacting with the elements moved to active position, and means movable by said contiguously mounted means upon said mechanical coaction for causing the device to be moved in accordance with the requests stored.

21. In a system for controlling an elevator movable by a source of power from one to another of a plurality of different landings, in which the application of power depends at least in part on the position of the elevator car; differently arranged means at said different landings, and means operable in accordance with the movements of said elevator car and coacting inductively with the differently arranged means at each of said different landings to produce a different signal for each of said different landings which positively identifies each signal with each different landing.

22. In a system for controlling a device movable from one to another of a plurality of positions, in which the movement of the device depends at least in part on the position of the device; a different arrangement of a plurality of magnetic means at at least some of said positions, and means operable in accordance with the movements of the device and responsive to said magnetic means at said positions to produce different signals for each of said positions.

23. In a control system for a device movable from one to another of a plurality of positions; a plurality of actuatable members carried by said movable device, differently arranged means at said different positions to actuate said actuatable members, movable means, and means comprising a plurality of moveable members coacting in response to the actuation of said actuatable members to effect a resulting movement of said movable means to locations different for each of said positions.

24. In a controlling and indicating system for an elevator movable to different floors, differently arranged means mounted in the hatchway at each floor, a number of associated means mounted on the elevator for inductive coaction with said differently arranged means as the elevator moves to different floors to generate signals for the floors to which the elevator is movable, each signal being different in character from the signals generated for all other floors, and means actuated in response to said signals which positively identifies each of said signals with a particular floor.

25. In a control system for a device movable from one to another of a plurality of positions, circuits associated with said device, means operable at each of said positions to establish a different combination of energized and deenergized circuits, a plurality of members, each of said members being associated with one of said circuits for operation upon energization or deenergization of the circuit with which it is associated, movable means, and means operated by said members for effecting a resulting movement of said movable means to locations different for each of said positions.

26. In a controlling and indicating system for an elevator movable to different floors, differently arranged means mounted in the hatchway at each floor, at least three associated means mounted on the elevator whereby they are moved relative to said differently arranged means, said associated means coacting inductively with said differently arranged means as the elevator moves to different floors to generate signals, each signal being different in character from the signals generated for all other floors, and means actuated in response to said signals comprising at least three elements movable in a geometrical ratio to each other for positively identifying each of said signals with a particular floor.

27. In a control system for an apparatus operable to different positions, a plurality of means for initiating signals indicating the different positions to which the apparatus is to be operated, a plurality of means for storing said signals, means for effecting the storing of a signal in said storage means, means operable for each of the positions to establish a different combination of energized and deenergized means for each of said positions, movable means, a plurality of members operated in response to said energized and deenergized means for effecting a movement of said movable means to locations different for each of said different positions and corresponding to said positions, and means operating in accordance with the movement of said movable means and coacting with the storing means for exercising the control until and when movement is achieved corresponding to stored signals.

28. In a control system for a device moveable from one to another of a plurality of positions, storage elements corresponding to said positions in which requests may be stored for the movement of the device to said positions, means to store requests in said elements including means moveable contiguous thereto for direct coaction therewith to store requests therein, means for generating a signal for each position to which the device moves which signal is different in character from the signals generated for other positions and positively identifies each different signal with a particular position, and means operated in accordance with said signals and coacting with the storage elements in which requests are stored for controlling the movement of the device.

29. In a control system for a device moveable from one to another of a plurality of positions, storage elements having a moveable element in which requests may be stored for the movement of the device to said positions, means to store requests in said element including means moveable contiguous thereto to move said moveable element from inactive to active position to store requests therein, means for generating a signal for each position to which the device moves which signal is different in character from the signals generated for other positions and positively identifies each different signal with a particular position, and means operated in accordance with said signals and movable relatively and contiguously to said moveable members in active position for controlling the movement of the device.

30. In a control system for a device moveable from one to another of a plurality of positions, storage elements corresponding to said positions in which requests may be stored for the movement of the device to said positions, means to store requests in said elements, means for generating a signal for each position comprising one or more impulses in combination which are different for each position and positively identifies each different signal with a particular position, and means operated in accordance with said signals and coacting with the storage elements in which requests are stored for controlling the movement of the device.

31. In a control system for a device moveable from one to another of a plurality of positions, means for initiating signals indicative of positions to which the device is requested to be moved and stopped, storage elements each having a moveable member in which requests may be stored for the movement of the device to said positions, means for moving the car towards the requested position, means for generating a signal for each position which signal is different in character from the signals generated for other positions and positively identifies each different signal with that particular position and indicates the position of the device, means mounted contiguous to said storage elements and coacting with said storage elements themselves for analyzing said storage means, and means operable to effect control of the device upon said coaction with a storage element containing a stored request when the signal generated corresponds to the position requested.

32. In a control system for apparatus operable by a source of power from one to another of a plurality of positions; storage means for registering requests for the operation of said apparatus to desired positions, said storage means being provided with movable elements each of which when moved from its normal position represents a stored request, analyzing means comprising a plurality of members movable adjacent said storage means, each said member being provided with surfaces for cooperation with said storage elements to control the operation of the apparatus, means producing a different signal for each position, each signal for each position differing from the signals for all other positions so as to positively identify each different signal with each different position, means for transmitting said signals, and means for effecting movement of said members in accordance to the signals transmitted.

33. In a control system for apparatus operable by a source of power from one to another of a plurality of positions; storage means for registering requests for operation of said apparatus to said positions, said storage means being provided with movable elements each of which when moved from its normal position represents a stored request, analyzing means comprising a plurality of members movable adjacent said storage means, each said member being provided with surfaces for cooperation with said storage elements to control the operation of the apparatus in accordance with the registered requests, an arrangement of signal actuating elements for each of said positions, means associated with said apparatus and operable as the apparatus moves to different positions to generate a signal different for each of said positions, and means for effecting movement of said members in accordance to said signals.

34. In a control system for apparatus movable by a source of power from one to another of a plurality of positions; means for initiating requests for the operation of said apparatus to desired positions, means for storing the requests, analyzing means comprising zoning means mounted contiguous to said storage means for mechanically coacting with the storage means themselves and including means movable upon coaction with the storage means in which a request has been stored to form two zones, one in each direction from the position of the apparatus, means for effecting the operation of said zoning means in accordance with the movement of the apparatus, and means operated by said zoning means for determining the direction in which the power is applied and for maintaining said direction until all the requests in that direction have been answered.

35. In a control system for apparatus movable by a source of power from one to another of a plurality of positions; means for initiating requests for the operation of said apparatus to desired positions, storage elements, means for actuating said storage elements in response to a request, analyzing means mounted for contiguous and relative movement with respect to said storage elements themselves for mechanically coacting with any actuated storage element during said relative movement and including a member movable upon said coaction with an actuated storage element, and means for stopping the apparatus as the result of the movement of said movable member at a time when the apparatus has reached the requested position.

36. In a control system for apparatus movable by a source of power from one to another of a plurality of positions; means for initiating requests for the operation of said apparatus to desired positions, storage elements, means for actuating said storage elements in response to a request, analyzing means comprising members movable contiguous to said storage elements themselves and coacting mechanically with the actuated storage elements, said means including members movable upon coacting with actuated storage elements to form two zones one in each direction from the position of the apparatus to control the direction of the operation of the apparatus, a single stopping means coacting with the same actuated storage elements to stop the apparatus, and means for effecting movement of said two members and stopping means in accordance with the movement of the apparatus.

37. In a control system for apparatus movable by a source of power from one to another of a plurality of positions; means for initiating requests for the operation of said apparatus to desired positions, storage elements, magnetically operable means common to all of said storage elements to actuate the same in response to a request, means analyzing said storage elements to control the direction of the operation of the apparatus, means coacting with the storage elements to stop the apparatus, magnetically operable means common to all said storage elements to reset the actuated elements when the requests have been answered, and means for effecting movement of said analyzing means and stopping means in accordance with the movement of the apparatus.

38. In an elevator control system for an elevator operable by a source of motive power from one to another of a plurality of floors, push buttons for initiating signals indicative of the floors at which the elevator is to stop; circuits interconnecting said push buttons with a plurality of circuit switching means; a plurality of storage elements corresponding to the floors capable of being actuated to indicate that there is a request for the elevator to stop at a corresponding floor; means for operating said circuit switching means in turn and for actuating said storage elements synchronously therewith, whereby a storage element corresponding to the push button is actuated at the time the corresponding circuit switching means is operated; control means comprising direction determining means comprising two members movable adjacent said storage elements for coaction therewith to form a zone in each direction from the position of the apparatus, one of said members upon coacting with actuated storage elements operating to control the application of power to the elevator in one direction, and the other of said members upon cooperation with actuated elements operating to control the application of power to the elevator in the other direction, means associated with said members for maintaining the elevator in operation in one direction until all of the requests in that direction have been answered, a single stopping means coacting with the actuated storage elements to stop the apparatus; means common to all of said storage elements to reset the corresponding actuated element when the elevator has stopped at a floor requested; means operated in accordance with the position of the elevator for generating a different signal as the elevator passes each different floor thereby indicating the floor, means for transmitting all of said signals over an electrical system used in common for all of said signals to said control means; and means for operating said direction determining means and said stopping means in accordance with the signals generated and transmitted to the control means.

39. In a control system for a device movable by a source of power from one to another of a plurality of positions by a source of power, means for storing a request to apply power to move the device to a particular position, means for generating a code signal comprising one or more impulses different for each position and indicative of the position of the device, means for transmitting the different code signals over a system which is used in common for the transmission of all of the signals to indicate the position of the device, and automatic means operated in response to said code signal and also operated in response to storage means in which requests are stored for terminating the application of power when the device reaches the position requested.

DONALD R. PUTT.

REFERENCES CITED

The following references are of record in the file of this patent:

UNITED STATES PATENTS

| Number | Name | Date |
|---|---|---|
| 826,752 | Smalley et al. | July 24, 1906 |
| 828,210 | Jacoby | Aug. 7, 1906 |
| 959,645 | Sundh | May 31, 1910 |
| 987,446 | Dunn | Mar. 21, 1911 |
| 1,073,130 | Hovland | Sept. 16, 1913 |
| 1,139,972 | Henschel et al. | May 18, 1915 |
| 1,171,284 | Vernson et al. | Feb. 8, 1916 |
| 1,219,061 | Worthen | Mar. 13, 1917 |
| 1,220,109 | Heiny | Mar. 20, 1917 |
| 1,581,383 | Bretusov | Apr. 20, 1926 |
| 1,627,320 | Dunlop et al. | May 3, 1927 |
| 1,639,190 | Knutsen | Aug. 16, 1927 |
| 1,777,131 | Seeger | Sept. 30, 1930 |
| 1,869,399 | Thompson | Aug. 2, 1932 |
| 1,887,493 | Miles | Nov. 15, 1932 |
| 1,898,550 | Lucas | Feb. 21, 1933 |
| 1,913,043 | Sanford | June 6, 1933 |
| 1,928,752 | Callaway | Oct. 3, 1933 |
| 1,929,391 | Liebenberg | Oct. 3, 1933 |
| 1,937,598 | Serrell | Dec. 5, 1933 |
| 1,948,685 | Stevens | Feb. 27, 1934 |
| 1,970,304 | Graham | Aug. 14, 1934 |
| 1,981,601 | Lewis | Nov. 20, 1934 |
| 1,984,516 | Brougham | Dec. 18, 1934 |
| 2,002,986 | Rubin | May 28, 1935 |
| 2,008,823 | Gale | July 23, 1935 |
| 2,046,977 | Sortore et al. | July 7, 1936 |
| 2,087,674 | Nelson et al. | July 20, 1937 |
| 2,090,748 | Chubb | Aug. 24, 1937 |
| 2,093,074 | Dickinson | Sept. 14, 1937 |
| 2,094,133 | Nelson et al. | Sept. 28, 1937 |
| 2,253,369 | Eames | Aug. 19, 1941 |